US009955057B2

United States Patent
Georgiev et al.

(10) Patent No.: US 9,955,057 B2
(45) Date of Patent: Apr. 24, 2018

(54) METHOD AND APPARATUS FOR COMPUTATIONAL SCHEIMPFLUG CAMERA

(71) Applicant: QUALCOMM Incorporated, San Diego, CA (US)

(72) Inventors: Todor Georgiev Georgiev, Sunnyvale, CA (US); Tharun Battula, Bryan, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/057,961

(22) Filed: Mar. 1, 2016

(65) Prior Publication Data

US 2017/0180618 A1 Jun. 22, 2017

Related U.S. Application Data

(60) Provisional application No. 62/270,509, filed on Dec. 21, 2015.

(51) Int. Cl.
*H04N 5/225* (2006.01)
*H04N 5/232* (2006.01)
(Continued)

(52) U.S. Cl.
CPC ......... *H04N 5/2259* (2013.01); *G02B 3/0037* (2013.01); *G02B 7/021* (2013.01);
(Continued)

(58) Field of Classification Search
CPC ............. H04N 13/0282; H04N 5/2259; H04N 5/2254; H04N 5/2253; H04N 5/23212;
(Continued)

(56) References Cited

U.S. PATENT DOCUMENTS

2008/0187305 A1* 8/2008 Raskar ............... G02B 27/0075
396/268
2009/0295829 A1* 12/2009 Georgiev ............. H04N 5/2254
345/620
(Continued)

OTHER PUBLICATIONS

International Search Report and Written Opinion—PCT/US2016/064001—ISA/EPO—dated Feb. 16, 2017.
(Continued)

*Primary Examiner* — Jason A Flohre

(74) *Attorney, Agent, or Firm* — Knobbe, Martens, Olson & Bear, LLP

(57) ABSTRACT

Method and devices are disclosed for focusing on tilted image planes. For example, one imaging device includes an objective lens configured to focus a scene at an image plane, the scene having an object plane tilted relative to the objective lens plane and a sensor receive light from the objective lens, the sensor having a plurality of light sensing elements configured to generate image data based on the light received at the sensor. The imaging device also includes a processor and memory component configured to receive the image data, the image data indicative of a first image; receive a tilt parameter indicative of an orientation of a selected non-parallel image plane, and convert the image data to relative image data based on the tilt parameter, the relative image data indicative of a second image focused along the non-parallel image plane.

27 Claims, 10 Drawing Sheets

(51) Int. Cl.
  *H04N 5/247* (2006.01)
  *G02B 3/00* (2006.01)
  *G02B 7/02* (2006.01)
  *G02B 7/10* (2006.01)
  *H04N 13/00* (2018.01)
  *H04N 17/00* (2006.01)
  *H04N 13/02* (2006.01)

(52) U.S. Cl.
  CPC ........... *G02B 7/102* (2013.01); *H04N 5/2253* (2013.01); *H04N 5/2254* (2013.01); *H04N 5/23212* (2013.01); *H04N 5/23293* (2013.01); *H04N 13/0232* (2013.01); *H04N 17/002* (2013.01); *H04N 5/23229* (2013.01); *H04N 5/247* (2013.01)

(58) Field of Classification Search
  CPC .. H04N 17/002; H04N 5/23293; H04N 5/247; G02B 3/0037; G02B 7/021; G02B 7/102
  See application file for complete search history.

(56) References Cited

U.S. PATENT DOCUMENTS

| | | | |
|---|---|---|---|
| 2010/0103175 A1* | 4/2010 | Okutomi | H04N 13/0242 345/428 |
| 2010/0103311 A1* | 4/2010 | Makii | H04N 5/23293 348/369 |
| 2010/0128145 A1 | 5/2010 | Pitts et al. | |
| 2010/0141802 A1 | 6/2010 | Knight et al. | |
| 2012/0127351 A1 | 5/2012 | Vlutters et al. | |
| 2013/0058591 A1* | 3/2013 | Nishiyama | H04N 5/217 382/264 |
| 2013/0321581 A1* | 12/2013 | El-Ghoroury | H04N 5/225 348/46 |
| 2014/0240532 A1* | 8/2014 | Marwah | H04N 5/2254 348/222.1 |
| 2014/0268043 A1 | 9/2014 | Raymond et al. | |
| 2015/0138383 A1 | 5/2015 | Kelley et al. | |
| 2015/0294472 A1* | 10/2015 | Putraya | G06T 7/0055 382/154 |
| 2015/0310601 A1 | 10/2015 | Rodriguez et al. | |
| 2016/0094774 A1* | 3/2016 | Li | H04N 5/23212 348/222.1 |

OTHER PUBLICATIONS

Kuthirummal S., et al., "Flexible Depth of Field Photography", IEEE Transactions on Pattern Analysis and Machine Intelligence, IEEE Computer Society, USA, vol. 33, No. 1, Jan. 1, 2011, XP011373495, pp. 58-71.

* cited by examiner

METHOD AND APPARATUS FOR COMPUTATIONAL SCHEIMPFLUG CAMERA

CROSS-REFERENCE TO RELATED APPLICATIONS

This application claims the benefit of U.S. Provisional Patent Application No. 62/270,509 filed Dec. 21, 2015, entitled "METHOD AND APPARATUS FOR COMPUTATIONAL SCHEIMPFLUG CAMERA" and assigned to the assignee hereof. The disclosure of this prior application is considered part of, and is incorporated by reference in, this disclosure.

FIELD

The present embodiments relate to imaging devices, and in particular, to methods and apparatus for focusing on tilted image planes.

BACKGROUND

The integration of digital processing technology with imaging devices and systems has enabled more powerful and easier to use photographic products. For example, the ability to digitally control the shutter speed of an imaging device, aperture, and sensor sensitivity has provided for improved picture quality in a variety of imaging environments without the need for a photographer to manually determine and set these parameters for each environment.

In traditional photography, a camera is manipulated to focus on a certain area of an environment. After capturing an image of the environment, portions of the image are either in focus or out of focus depending on the orientation and location of the portions relative to the camera. Many areas not in focus cannot be made in focus due to the relative orientation of the area with respect to the various optical components of the camera. In existing camera systems, to bring areas that are not initially in focus into focus, the hardware elements of the camera (e.g., the lens system) must be manipulated for a new focus position. Accordingly, a user of a camera may capture multiple images of an environment, manipulating the hardware elements with each image, just to capture (in focus) a single sought after image of an environment, or of one or more objects in a certain area of a scene. It would be advantageous for use in camera systems, in terms of photographic effects, to enable a computational ability to focus on a tilted plane after the target scene is captured, and gain the flexibility that Scheimpflug tilt-shift techniques offer to photography.

SUMMARY

The system, methods, and devices of the disclosure each have several innovative aspects, no single one of which is solely responsible for the desirable attributes disclosed herein. Combinations of the innovations, aspects, and features described herein can be incorporated in various embodiments of systems, methods, and devices, and such combinations are not limited by the examples of embodiments described herein, including the summary described below.

Some embodiments may include an imaging apparatus. The imaging apparatus may include an objective lens positioned at an objective lens plane, the objective lens configured to focus light received from a scene at an image plane, the scene having an object plane tilted relative to the objective lens plane. In some embodiments, the image plane may be positioned at the focal point of the objective lens and may be parallel to the objective lens plane. The imaging device may also include a sensor positioned to receive light propagating through the objective lens, the sensor having multiple light sensing elements disposed on a surface of the sensor in a sensor plane, the light sensing elements configured to generate image data based on the light received at the sensor, the sensor plane being parallel to the objective lens plane. In some embodiments, the image data may be light field data of scene. The image data may also include radiance data and spatial and angular data of the scene based on the light received by the light sensing elements.

The imaging apparatus may further include a processor, operably coupled to the sensor and a memory component, operably coupled to the processor. The processor and memory component may be collectively configured to receive the image data generated by the light sensing elements, the image data indicative of a first image focused at the image plane by the objective lens; receive a tilt parameter indicative of an orientation of a selected non-parallel image plane, the non-parallel image plane having an orientation at an angle relative to the objective lens plane; and convert the received image data to relative image data based on the received tilt parameter, the relative image data indicative of a second image focused along the non-parallel image plane. In some embodiments, the tilt parameter may be based on the angle between the non-parallel image plane and the image plane. The non-parallel image plane and the objective lens plane may intersect at an intersection point. The object plane may also intersect the intersection point of the non-parallel image plane and the objective lens plane.

In some embodiments, the imaging apparatus may also include an optical element positioned to receive light propagating through the objective lens and disposed between the sensor and the objective lens. The optical element may be configured to produce micro images of the scene on the light sensing elements. In this embodiment, the processor and memory component may be further configured to identify a point along the non-parallel image; measure radiance values of light rays emitted from a point at the light sensing elements, where the radiance values may be based on the micro images of the point at the sensor; and determine directional data based on the tilt parameter. Determining direction data may further include calculating a point offset based on the micro image of the point and a geometric relationship of the non-parallel image plane relative to the image plane, and associating the offset with at least one radiance value of the micro image used to calculate the offset.

In some embodiments, the optical element may be a microlens array including multiple microlenses, each microlens can be configured to produce a micro image of the scene. While in other embodiments, the optical element may be multiple cameras arranged in an array and configured to produce multiple micro images of the scene at the sensor. In some embodiments, the optical element may be a plenoptic camera.

In some embodiments, the processor and memory component can be further configured to determine a relative position of each micro image on the sensor. The image data may include the relative position and radiance value captured at each light sensing element. The relative positions of the image data can be calculated by applying a ray trace to light a point along the non-parallel image plane to the micro image captured by the optical element, the micro image representing a micro image of the point.

The imaging device may also include a display in data communication with the processor, the display can be configured to receive the second image from the processor and display the second image. In some embodiments, the processor and memory component can be further collectively configured to generate a quadrilateral overlay on the displayed second image indicative of the non-parallel image. The quadrilateral overlay may be based on a projective transform derived from the angle between the non-parallel image plane and the objective lens plane.

According to another aspect, a method for displaying an image of a scene is disclosed. This method may include receiving light from a scene by an objective lens and focusing the light at an image plane. The objective lens can have an objective lens plane and the scene may include an object plane tilted relative to the objective lens plane. The method may also include receiving light propagating through the objective lens at a sensor, the sensor may have multiple light sensing elements disposed on a sensor plane, and generating image data by the light sensing elements based on light received at the sensor. The method can also include receiving the image data generated by the light sensing elements, the image data may be indicative of a first image focused at the image plane by the objective lens, and receiving a tilt parameter indicative of an orientation of a selected non-parallel image plane. In some embodiments, the tilt parameter can be based on the angle between the non-parallel image plan and the image plane. The non-parallel image plane can have an orientation at an angle relative to the objective lens plane. The method can also include converting the received image data to relative image data based on the received tilt parameter, the relative image data may be indicative of a second image focused along the non-parallel image plane; receiving the second image at a display; and displaying the second image. In some embodiments, displaying the second image may include generating a quadrilateral overlay on the displayed second image indicative of the non-parallel image, where the quadrilateral overlay is based on a projective transform derived from the angle between the non-parallel image plane and the objective lens plane.

In some embodiments, this method can also include receiving light propagating through the objective lens by an optical element disposed between the sensor and the objective lens, and producing micro images of the scene on the light sensing elements by the optical element. In one embodiment, the image data may be light field data of the scene. In some embodiment, converting the received image data to relative image data can include identifying a point along the non-parallel image; measuring radiance values of light rays emitted from a point at the light sensing elements, the radiance values can be based on the micro images of the point at the sensor; and determining directional data based on the tilt parameter. In some embodiments, the determining directional data can include calculating a point offset based on the micro image of the point and a geometric relationship of the non-parallel image plane relative to the image plane, and associating the offset with at least one radiance value of the micro image used to calculate the offset.

In some embodiments, the optical element may be microlens array comprising multiple microlenses, where each microlens may be configured to produce a micro image of the scene. In other embodiments, either alternatively or in combination, the optical element can include multiple cameras arranged in an array and configured to produce multiple micro images of the scene at the sensor.

In some embodiments, the image plane can positioned at the focal point of the objective lens and may be parallel to an objective lens plane. In at least one embodiment, the image data includes radiance, spatial, and angular data of the scene based on the light received by the light sensing elements. In some embodiments, the non-parallel image plane and the objective lens plane intersect at an intersection point.

In some embodiments, the method may also include determining a relative position of each micro image on the sensor. The image data may include the relative position and radiance value captured at each light sensing element. The relative positions of the image data can be calculated by applying a ray trace to light a point along the non-parallel image plane to the micro image captured by the optical element, the micro image representing a micro image of the point.

According to another aspect, a non-transitory computer readable medium comprising instructions that when executed cause a processor to perform a method of displaying an image of a scene is disclosed. This method may include receiving image data of a scene generated by multiple light sensing elements, the image data may be indicative of a first image focused at an image plane by the objective lens. The multiple light sensing elements may be disposed on a sensor plane of a sensor and configured to receive light propagating through the objective lens, the objective lens having an objective lens plane. The objective lens may be configured to focus light of the scene at the image plane, where the scene has an object plane tilted relative to the objective lens plane. The method may also include receiving a tilt parameter indicative of an orientation of a selected non-parallel image plane, the non-parallel image plane having an orientation at an angle relative to the objective lens plane; converting the received image data to relative image data based on the received tilt parameter, the relative image data may be indicative of a second image focused along the non-parallel image plane; and receiving the second image at a display and displaying the second image.

According to another aspect, an imaging device is disclosed. The device may include a means for receiving light from a scene having a first plane; a means for focusing the light at an image plane, the scene having an object plane tilted relative to the first plane; and a means for receiving light propagating through the first plane having a second plane parallel to the first plane, and generating image data based on light received at the second plane. The method may also include, a means for receiving the generated image data. The image data may be indicative of a first image focused at the image plane. The method may further include a means for receiving a tilt parameter indicative of an orientation of a selected non-parallel image plane, where the non-parallel image plane may have an orientation at an angle relative to the first plane; converting the received image data to relative image data based on the received tilt parameter, where the relative image data may be indicative of a second image focused along the non-parallel image plane; and receiving the second image at a display and displaying the second image.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
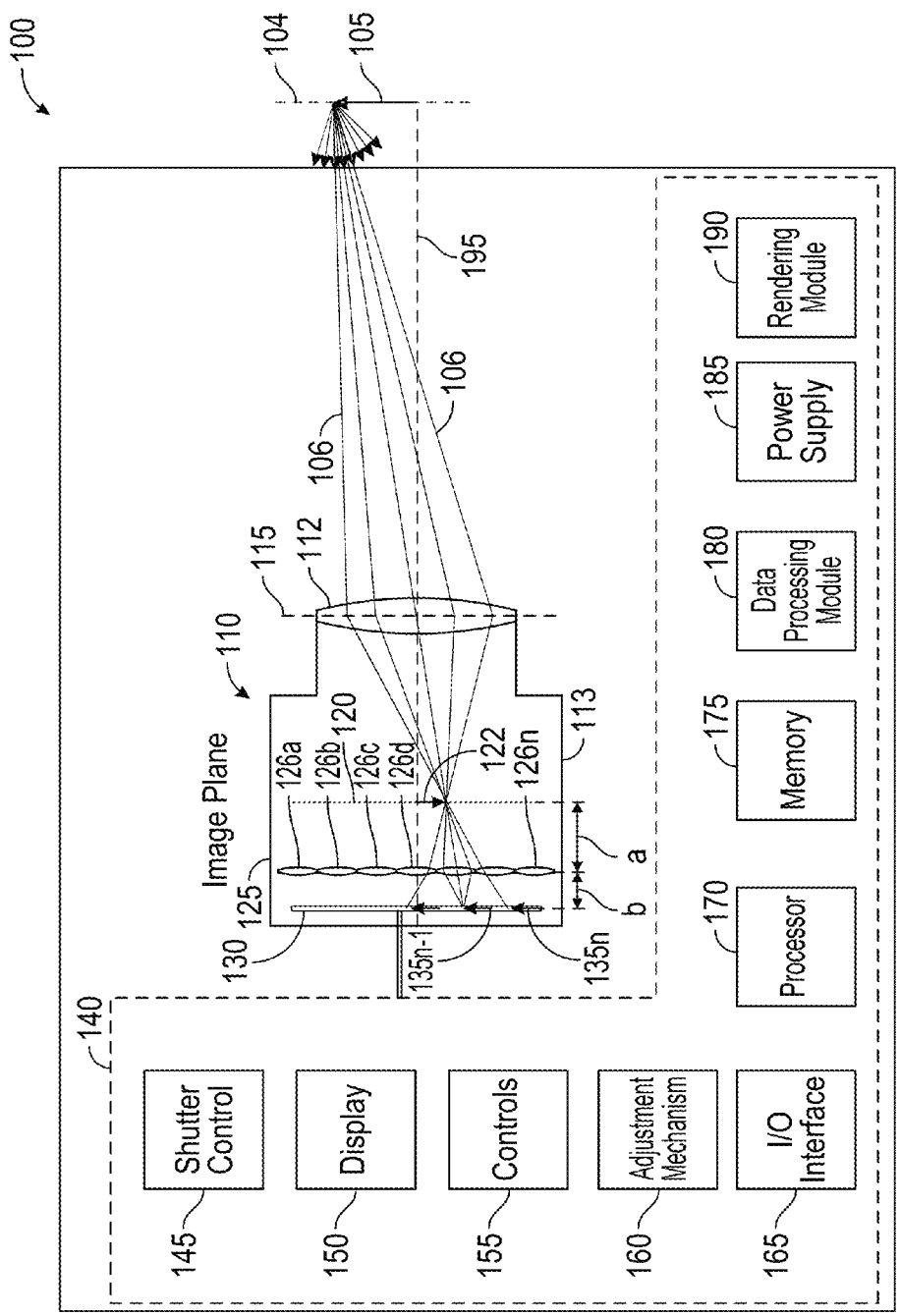
FIG. 1 is a schematic block diagram of an example of a camera linked to an image processing system in accordance with some embodiments.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures, and techniques may be shown in detail to further explain the examples.

The embodiments disclosed herein describe imaging devices (which may also be referred to as an imaging system) that provide for tilt-shift functionality while the optical elements of the imaging device are in a parallel orientation relative to each other. One non-limiting advantage of the embodiments disclosed herein is that the imaging devices may be configured to focus on any image plane regardless of orientation and position relative to the optical components.

It should be noted that the term "parallel" or other variations of the word parallel as used herein may indicate elements that are aligned to be parallel. However, it will be understood that aligned to be parallel may not be limited to being exactly or perfectly parallel, and may be understood to include slight variations in the orientation of the elements relative to other elements of the system. For example, aligned to be parallel may encompass and angle of two, three, or more degrees from exactly parallel. The amount of variation from exactly parallel is dependent on the optical properties of optical elements of the camera system, and variations are permitted such that the imaging devices disclosed herein are capable of operating for their intended purpose.

As used herein the terms "tilted" and "non-parallel" or other variations of these words as are used interchangeable to indicate an orientation of one plane relative to another plane. For example, a first plane may be orientated vertically, and a second plane may be orientated at some tilt angle relative to the first plane such that they two planes are in a non-parallel state relative to each other. It will be understood that the necessary angular tilt to be non-parallel may be any angle such that the two planes are not parallel as the term is used in herein. Furthermore, a plane may be tilted or non-parallel in multiple directions, for example, a first plane may be non-parallel with respect to a second plane in both a first and second direction on a Cartesian coordinate plane (e.g., the plane may be tilted along an X, Y, or Z direction).

Embodiments described herein include methods, apparatuses, and computer readable media configured for rendering or displaying an image focused on an image plane after capturing image data of a target scene through post-capture processing. In some embodiments, the method, apparatus, and computer readable media may apply to a full-resolution plenoptic camera (also referred to as a radiance camera or light-field camera) or to components of the camera. While embodiments disclosed herein are illustrated with reference to plenoptic cameras, it will be understood that the methods and apparatuses for focusing an image after capturing a scene as disclosed herein may be applied to any camera system or any image data acquired from a real scene. These methods and apparatus provide improvements over existing commercial embodiments in the image capture and focusing capabilities using image data acquired from a scene. In some embodiments, the camera systems and methods disclosed herein may be part of a cellular telephone or other mobile device and thus be sized to fit within a compact package. In other embodiments, the camera systems may be a standalone imaging device.

In traditional photography, a camera is manipulated to focus on a certain area of a target scene prior to taking a picture. After capturing an image of the target scene, portions of the image are either in focus or out of focus. Some portions not in focus cannot be made in focus, for example a surface of the target scene that is tilted at an angle relative to the imaging device. To bring areas not in focus into focus, the hardware elements of the camera (e.g., the lens system) must be manipulated for a new focus position. Conversely, a light-field, or a plenoptic, camera use special optical elements and photosensors to capture a light field of a scene. Plenoptic cameras are capable of capturing, in a single image, the radiance of multiple rays of light from a scene, for example, at multiple points in space. For example, plenoptic cameras measure not just the radiance of light at a location on the photosensor, but also determine how much light arrives at the photosensor along each ray of light. With a plenoptic camera, since the color, direction, and intensity of multiple light rays of the scene is captured, focusing may be performed using software after the image has been captured. Manipulating the focus position after an image is captured allows a user to modify which area of the image is in focus at any time without recapturing an image of a scene.

In many plenoptic cameras, the light enters a main (objective) lens and passes through an array of microlenses before being captured by a photosensor. The objective lens may include a single lens or may comprise multiple optical elements configured to collect light from the scene and focus the light onto a photosensor. Each microlens of the array of microlenses may have a relatively small size, for example 100 µm, and a relatively large depth of focus. This allows the camera to capture all portions of a target scene by capturing numerous small images, or micro images, from slightly different viewpoints using each of the microlenses of the microlens array. For example, using a microlens array permits the photosensor to measure not just the total amount of light incident on photosensor but also how much light arrives along each ray of light incident on the photosensor (e.g., measures the light field data).

In some implementations, once the light field data is measured by the photosensor to determine the amount of light on the photosensor and the direction of each ray of light based on the amount of light for each ray, software implemented in an image processing system may be configured to extract and manipulate the light field data to produce an image at a desired depth of focus of the scene during post-processing. For example, the light field data provides the amount of light traveling along each ray that intersects the photosensor. This may be considered capturing or generating a directional lighting distribution arriving at each light sensing element of a photosensor. Then ray tracing techniques may be applied to the light field data to compute a ray trace of a given ray of light to determine where the ray would have terminate if the imaging device had been configured in the desired arrangement (e.g., if the imaging device would have been positioned to focus on a given focus depth or orientation).

In some implementations, plenoptic cameras use microlens arrays to capture the 4D light field data of the target scene of interest. The acquired 4D radiance, as an integral image (e.g., light field data as an image), can be processed for either 3D scene reconstruction or synthesizing dynamic depth of focus (DoF) effect. There are numerous applications for this emerging camera technology, ranging from entertainment to depth recovery for industrial and scientific applications. Some light field cameras can capture 20 different views of a scene with a 10 megapixel sensor (Adobe®, San Jose, Calif.). However, the rendered 700×700 pixel images may have visible artifacts at occlusion boundaries. The Lytro® light field (lytro.com) camera uses an 11 megapixel sensor to acquire the radiance.

Conventional cameras have an image plane that is parallel to a lens plane. Thus, conventional cameras focus a scene on the image plane that is parallel to the sensor. Whereas, a Scheimpflug camera includes hardware arranged such that an image plane is tilted relative to the objective lens plane, and thus is also tilted relative to the sensor. Scheimpflug cameras can be configured to focus a target scene on tilted planes, for example on a plane parallel to the conventional optical axis of the camera and perpendicular to the conventional image plane. It would be advantageous for use in a camera system, in terms of photographic effects, to enable a computational ability to focus on a tilted plane after the target scene is captured, and gain the flexibility that Scheimpflug tilt-shift techniques offer to photography.

In one implementation, Scheimpflug photography facilitates focusing the camera on a tilted or shifted plane. In one implementation, a lens plane is tilted relative to the image plane. The ability to focus on a tilted plane has been lost in modern day digital cameras as image plane and lens plane are parallel and fixed in conventional cameras. The embodiments disclosed herein describe cameras that provide for tilt-shift functionality while the optical elements of the camera are in a substantially parallel orientation, thereby enabling digital cameras to focus on any plane. In one embodiment, the tilt-shift functionality is facilitated by Scheimpflug principles. This is done computationally from image data. For example, using plenoptic cameras, constructed with a microlens array, or using an array of cameras, light filed data is captured, e.g., the full radiance of the target scene. The light field data includes spatial data and angular data of the entire target scene captured on the photosensor of the camera. One non-limiting advantage of the cameras disclosed herein is that focusing calculations are done at a later stage, after the image and light field data of the target scene are captured. Embodiments disclosed herein cover methods and devices for rendering a final image on an image plane orientated at any angle in 3D space relative to the objective lens based on the light field data of the target scene. The final image is focused on any tilted plane after capturing the scene at the sensor. Such functionality extends existing plenoptic camera rendering methods, which only focus on planes parallel to the lens plane.

In some embodiments, the post capture rendering of a focused image on a tilted image plane has been implemented for a plenoptic camera setup. In one implementation, a plenoptic camera setup includes an objective lens positioned at some distance from the sensor, such that the target scene is focused at the image plane of the objective camera lens, and a microlens array positioned at some distance between the image plane and the sensor. In this embodiment, an objective lens image is formed at the image plane between the objective lens and the microlens array. The objective lens image is captured and re-imaged on the sensor as multiple virtual micro images from the microlens array. In this configuration, the sensor may be placed at a distance behind the microlens array. In some embodiments, the distances between the various elements and the focal lengths of the objective lens and microlenses of the microlens array satisfy the lens equation and construct a relay system with the main camera lens. One non-limiting advantage of this embodiment is that these configurations decouple the resolution of the plenoptic camera from number of microlenses forming the microlens array, and makes radiance sampling more flexible. The photographer is free to vary resolution while taking the picture: The spatial resolution of these plenoptic cameras may be related to the distance between the microlens array and the sensor divided by the distance from the objective lens to the microlens array, and can be varied by moving the microlens array relative to the sensor.

Another non-limiting advantage of the plenoptic cameras disclosed herein, is that capturing imaging data improves processing capabilities. For example, application of these cameras may solve many of the problems faced by photographers using conventional digital cameras. Rendering refocused images and 3D views are just two example capabilities, but there are many others, including HDR and multispectral imaging, super-resolution, and much more.

Another aspect of embodiments disclosed herein includes a user interface (UI), which can be incorporated into the imaging devices capable of utilizing image data for post processing focusing of image on any image plane for use in other applications on the device which are related to 3D functionalities, e.g., for example games, stereo, or microscopy. In some embodiments, the UI may be capable of displaying a rectangle in a displayed image as a quadrilateral indicative of the tilted image plane on which the image is focused. One non-limiting advantage of the UI is added visualization for users of the imaging device to assist with manipulating and adjusting the image plane for focusing the displayed image.

FIG. 1 is a block diagram of an example of an embodiment of an imaging device 100 that includes a plenoptic camera 110 coupled to an image processing system 140. The image processing system 140 is in communication with the plenoptic camera 110 and is configured to receive and process images that are captured by the plenoptic camera 110. In some embodiments, the plenoptic camera 110 may comprise at least one optical element used within a camera system, wherein the camera system (not shown in this figure) is configured to capture an image of a target scene 105 as viewed by the plenoptic camera 110. The image processing system 140 may include the components used to manipulate, process, or save the captured image.

The plenoptic camera 110 includes components that are configured to receive, guide, and sense light from a target scene 105 located at an object plane 104. As illustrated in FIG. 1, the plenoptic camera includes an objective lens 112, a microlens array 125, and a photosensor 130. The objective lens 112 is positioned and exposed to receive light (e.g., light rays 106) from target scene 105 which may include at least one object of interest located somewhere in the target scene 105 (for example, a scene or object in the field-of-view of the plenoptic camera 110). It will be understood that while objective lens 112 is illustrated as a single optical element in FIG. 1, the objective lens may comprise one or more optical elements, not limited to only lenses (e.g., the objective lens may comprise one or more lenses, refractive elements, dispersive elements, mirrored elements, and/or directing elements).

Light received at the objective lens propagates through the objective lens 112, and further propagates through an objective lens image plane 120 before being incident on microlens array 125. In the illustrated embodiment, the microlens array 125 may include a two-dimensional array of individual microlenses 126a-n, where each of the microlenses 126a-n of the microlens array 125 may be of the same size and shape. The microlens array 125 may comprise sufficient microlenses 126a-n and be positioned such that active areas of the photosensor 130 receive at least a portion of the image formed by light propagating through the objective lens 112. The photosensor 130 may comprise multiple light sensing elements configured to detect incident light and generate output image data based on the detected light. The microlens array 125 may be formed on or from a substrate (or wafer) having a certain thickness, and after formation the thickness of the microlens array 125 may be the same or substantially the same as the thickness of the wafer formed therefrom or thereon. While depicted in FIG. 1 as a two-dimensional stack of microlenses, it will be understood that the microlens array may be a planar collection or array of microlenses.

The objective lens image plane 120 is a plane located where light rays 106 from target scene 105 that propagated through the objective lens 112 pass through, such rays forming an image 122 of the target scene at the image plan 120. The target scene 105 may be reflecting radiation (e.g., light) or emitting radiation (e.g., light) or may be reflecting and emitting light. In some embodiments, the plurality of microlenses 126a-n in the microlens array 125 may be focused between the objective lens image plane 120 of the objective lens 112 and the photosensor 130. That is, the microlens array 125 may have a focal length, in the direction of the objective lens image plane 120, the focal length being equal to, or substantially equal to, the distance between the microlens array 125 and the image plane 120 of the objective lens 112. While there may not be any structure physically located at the objective lens image plane 120, the objective lens image plane 120 may be considered to be a planar location in space having an image "in the air" of the scene created by light propagating through the objective lens 112. The microlens array 125 may be configured to focus light onto the photosensor 130. Light received from the objective lens 112 propagates through the microlens array 125 and then onto the photosensor 130. The photosensor 130 may be located at a distance less than or equal to f from the microlens array 125, where f refers to the focal length of the microlenses 126a-n of the microlens array 125 in the direction of the photosensor 130, where light propagating through the microlens array 125 is focused. The distances between the photosensor 130 and the microlens array 125 may vary based on the optical design of the imaging device 100. These distances may be varied to achieve a modulation transfer function (MTF) above the Nyquist frequency.

In operation, each microlens 126a-n of the microlens array 125 may receive light representing or corresponding to a portion (e.g., area or region) of an image. Light representing the portion of the image may propagate through the microlens array 125 and be redirected by the microlens array 125 to be guided onto a corresponding region of the photosensor 130. Thus, each microlens 126a-n of the microlens array 125 and its corresponding region of the photosensor 130 may function similarly to a small camera that captures a small image (or micro image 135a-n) from an image 122 at the image plane 120, and where the compilation of micro images 135a-n captured by each of the microlenses 126a-n of the microlens array 125 captures the image 122 at the objective lens image plane 120. By focusing the microlenses 126a-n of the microlens array 125 on the image 122 produced by the objective lens 112 at the objective lens image plane 120, the plenoptic camera 110 may be configured to capture 4D light field data, e.g., spatial and angular data of radiance from the target scene 105. The 4D light field data may include position and directional information of the radiance from the target scene 105 along with radiance or intensity data of the target scene 105. This may allow the plenoptic camera 110 to generate high resolution images from the light-field data captured that surpass the resolution of images from previous cameras and that meet the requirements and desires of modern photography.

Still referring to FIG. 1, the image processing system 140 is in electronic communication with the photosensor 130 to receive and save information of light received at each pixel of the photosensor 130 and the light propagating through each microlens 126a-n in the microlens array 125 resulting in micro images 135a-n. In some embodiments, the photosensor 130 may comprise a plurality of pixels (for example, a megapixel photosensor, etc.), and one or more pixels of the plurality of pixels may capture portions of the target scene from each microlens 126a-n of the microlens array 125. After the micro images 135a-n of the target scene 105 is captured on the photosensor 130, the image processing system 140 may calculate a depth for each pixel in the array or otherwise renders high-resolution images from the data collected by the photosensor 130.

As shown in FIG. 1, the distance "a" indicates the distance between the objective lens image plane 120 and the microlens array 125. The distance "b" represents the distance between the microlens array 125 and the photosensor 130. A distance f indicates the focal length of the microlenses 126a-n of the microlens array 125, each of the microlenses 126a-n of the microlens array 125 being of the same dimensions. As discussed above, since the photosensor 130 is located at or less than the focal length f of the microlens array 125, the focal length of the microlens array 125 being in the direction of the photosensor 130. The distance b is less than or equal to f. In some embodiments, the distances a and b are adjusted (accordingly adjusting the position of the microlens array 125). The microlens array 125 may be carefully moved and/or adjusted with regards to the positions between the objective lens image plane 120 and the photosensor 130. The distance a may also be referred to as a pitch, and may be adjusted by an adjustment mechanism 160 as discussed below. For example, the thickness of the microlens array substrate (or wafer) could be adjusted to manipulate the distance a or b such that the microlens array 125 could be moved closer to the photosensor 130 as needed to achieve optimal design performance.

FIG. 1 also illustrates an example of an embodiment of a plenoptic camera 110 including various components that may be integrated in the camera (which may correspond to the imaging device 100). The camera, in some embodiments, may comprise two general portions: optics 113 and image processing system 140. The optics 113 may include one or more of the optical components of the camera. For example, the optics 113 may include a shutter (not shown), the objective lens 112, the microlens array 125, and the photosensor 130. The image processing system 140 may include a variety of components, for example, the photosensor 130 (when not included in the optics 113), a shutter control 145, a viewfinder/screen 150, controls 155, an adjustment mechanism 160, an input/output (I/O) interface 165, a processor 170, a memory 175, a data processing module 180, a rendering module 190, and a power supply 185. In some embodiments, additional or fewer components than those listed herein may be included in the imaging device 100. The components of image processing system 140 may be coupled together and/or in communication with each other as necessary to perform their associated functionality. In some embodiments, one or more components described above may be in one or more of the optics 113 and the image processing system 140. Additionally, or alternatively, one or more components of the optics 113 may be integrated into the image processing system 140, or vice versa.

In some embodiments, one or more components of the optics 113 may be in a fixed location such that they may not move in relation to the other components of the optics 113. For example, a position of one or more of the objective lens 112 and the microlens array 125 may be fixed in relation to one or more of the other components. In some embodiments, one or more of the components of the optics 113 may be movable in relation to one or more of the other components. For example, the objective lens 112 may be configured to be movable in a direction towards or away from the microlens array 125, for example, for focusing. The microlens array 125 may be configured to be movable towards or away from the objective lens 112, and/or be configured to move laterally (relative to the light optical path from the objective lens 112 to the photosensor 130), for example, to align the microlenses 126a-n of the microlens array with objective lens 112 and/or the photosensor 130. In some embodiments, the photosensor 130 may comprise one or more of conventional film, a charge-coupled device (CCD), a complementary metal-oxide semiconductor (CMOS), or the like.

In some embodiments, the image captured on the photosensor 130 may be processed by the image processing system. For example, the data processing module 180 may use a full-resolution light-field rendering method (or other image processing algorithms for application to images captured by a plenoptic camera) to generate high-resolution images from the captured image and to refocus the image on a tilted image plane in accordance with the methods disclosed herein. In some embodiments, the data processing module 180 may be implemented using hardware, software, or a combination thereof. In some embodiments, the captured image data may be stored in a memory 175 for later rendering by a rendering module 190 configured to generate post processing images based on full-resolution light-field rendering (or similar) methods as disclosed herein. In some embodiments, the rendering module 190 may be configured as part of the image processing system while in other embodiments the rendering module may be a separate device or computer system. In some embodiments, post processing images generated from the captured image data may be stored in the memory 175.

The shutter of the plenoptic camera 110 may be located in front of or behind the objective lens 112. The shutter can be configured to control when light is allowed to pass to the photosensor 130, and how much light is passed to the photosensor 130. For example, when the shutter is closed, no light may pass from outside the optics 113 to the photosensor 130. When the shutter is opened, light may pass through the objective lens 112 to and through the microlens arrays 125 and to the photosensor 130. The processor 170 may be configured to receive an input from the shutter control 145 and control the opening and closing of the shutter based on the shutter control 145. The viewfinder/screen 150 may be configured to show the user of the imaging device 100 a preview of the image the imaging device 100 will capture if activated in a given direction. In some embodiments, the viewfinder/screen 150 may be configured to allow the user to view and select options (for example, via a menu or similar interface) of the imaging device 100 or to view and modify images that have already been captured by the imaging device 100 and stored in the memory 175. In one implementation, the viewfinder/screen 150 may be a display configured to display a rectangle overlaid on the captured image representative of a tilted image plane used for focusing the captured image on the tilted image plane. In some embodiments, the imaging device 100 may utilize the power supply 185 to provide power to the components of the imaging device 100. In some embodiments, the power supply 185 may comprise a battery (for example, a rechargeable or replaceable battery) or a connector to an external power device. The memory 175 may be configured to store images captured by the optics 113 and processed by the data processing module 180. In some embodiments, the memory 175 may be configured to store settings and adjustments as entered by the controls and the adjustment mechanism 160. In some embodiments, the memory 175 may be removable or a combination of removable and permanent memory. In some embodiments, the memory may all be permanent.

In some embodiments, the I/O interface 165 of the imaging device 100 may be configured to allow the connection of the camera to one or more external devices, such as a computer or a video monitor. For example, the I/O interface 165 may include a USB connector, an HDMI connector, or the like. In some embodiments, the I/O interface 165 may be configured to transfer information between the imaging device 100 and the connected external device. In some embodiments, the I/O interface 165 may be configured to transfer information wirelessly (for example via infrared or Wi-Fi). In some embodiments, the controls 155 described above may be configured to control one or more aspects of the camera, including settings associated with the optics 113 (for example, shutter speed, zoom, f-number, etc.), navigating the options and menus of the camera, viewing and/or modifying captured images via the data processing module 180, or rendering a refocused image on a tilted image plane after capturing an image via data processing module 180 and/or rendering module 190. In some embodiments, the adjustment mechanism 160 may be configured to adjust a relative location one or more of the components of the optics 113. For example, the adjustment mechanism 160 may be configured to adjust a distance between the microlens array 125 and the objective lens 112 or the photosensor 130. Additionally, or alternatively, the adjustment mechanism 160 may be configured to adjust a distance between the microlens array 125 and the photosensor 130.

Figure 2A:
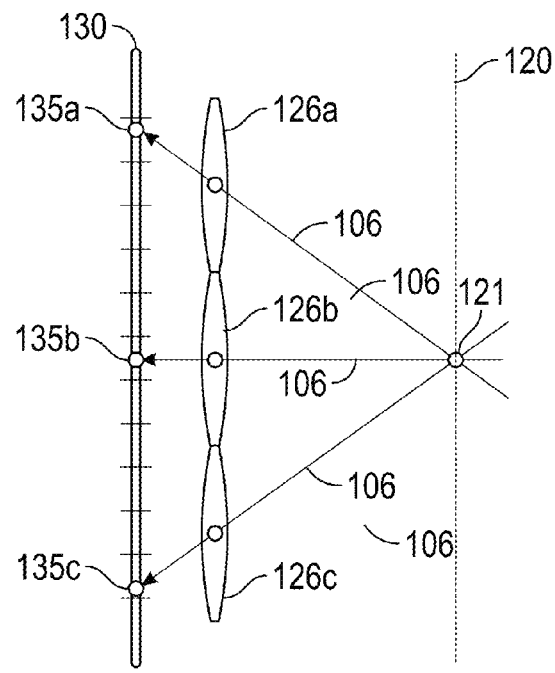
FIGS. 2A-B illustrates certain exemplary aspects of an plenoptic camera performing a shift in focus depth.
Figure 2B:
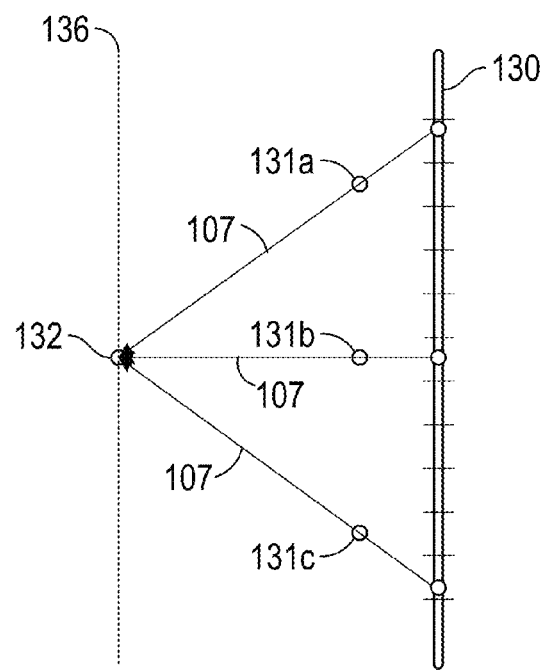

FIGS. 2A-B illustrate an example of a plenoptic camera arrangement. FIG. 2A illustrates the image plane 120, photosensor 130, and a portion of microlens array 125 of FIG. 1.

FIG. 2B illustrates a virtual photosensor located at a virtual image plane 136 rendered by the image processing system 140 of FIG. 1. FIG. 2B illustrate a virtual point 132 that is a reconstruction of an image focused at focal point 121. As described above with reference to FIG. 1, a target scene 105 may be located at located at an object plane 104 and. The plenoptic camera 110 is configured to receive light rays 106 from target scene 105 at image plane 120, as described above with reference to FIG. 1.

Referring again to FIG. 2A, light rays enter plenoptic camera 110 and are focused at focal point 121 on image plane 120. The light rays 106 continue to the microlens array 125. In the embodiment illustrated herein, photosensor 130 is configured to be substantially parallel to the objective lens plane of objective lens 112. In some embodiments, microlens array 125 may be substantially parallel to the photosensor 130 and/or objective lens plane of objective lens 112. As described above, each microlens, e.g., microlens 126a-c, of the microlens array 125 focuses the light onto photosensor 130. In some embodiments, the photosensor 130 may be substantially parallel to the microlens array 125, the image plane 120, and/or the objective lens plane of objective lens 112. Photosensor 130 is then capable of capturing the light-field data of the image.

FIG. 2B illustrates a virtual ray path 107 traced from the photosensor 130 to and rendered at the virtual rendered image plane 136 to determine an image for an imaging device configured to have a real image plane at the same position as virtual image plane 136. For example, data points representing micro-images 135a-c of FIG. 2A captured on photosensor 130 may be utilized by the image processing system 140 to calculate a virtual ray path 107 based on the light-field data, the virtual ray path 107 may include data points 131a-c and may include multiple data points along each virtual ray path 107. The virtual ray path 107 may be extrapolated to any render image plane and an image may be rendered, for example, the virtual light rays 107 are focused at virtual point 132. At virtual point 132 an image is formed for the data points representing micro-images 135a-c as captured by photosensor 130. In some embodiments, virtual image plane 136 may be parallel to the photosensor 130 as illustrated in FIG. 2B. Accordingly, virtual point 132 is a reconstruction of an image captured at focal point 121. However, it will be understood that any orientation of virtual image plane 136 is possible (e.g., any tilt angle in three-dimensional space relative to the photosensor 130). In one embodiment, data points representing micro-images 135a-c may be captured by photosensor 130 and the light-field data associated with points representing micro-images 135a-c may be stored in memory 175 of FIG. 1. The data processing module 180, processor 170, and memory 175 may be collectively configured to render an image at the virtual image plane 136.

Figure 3:
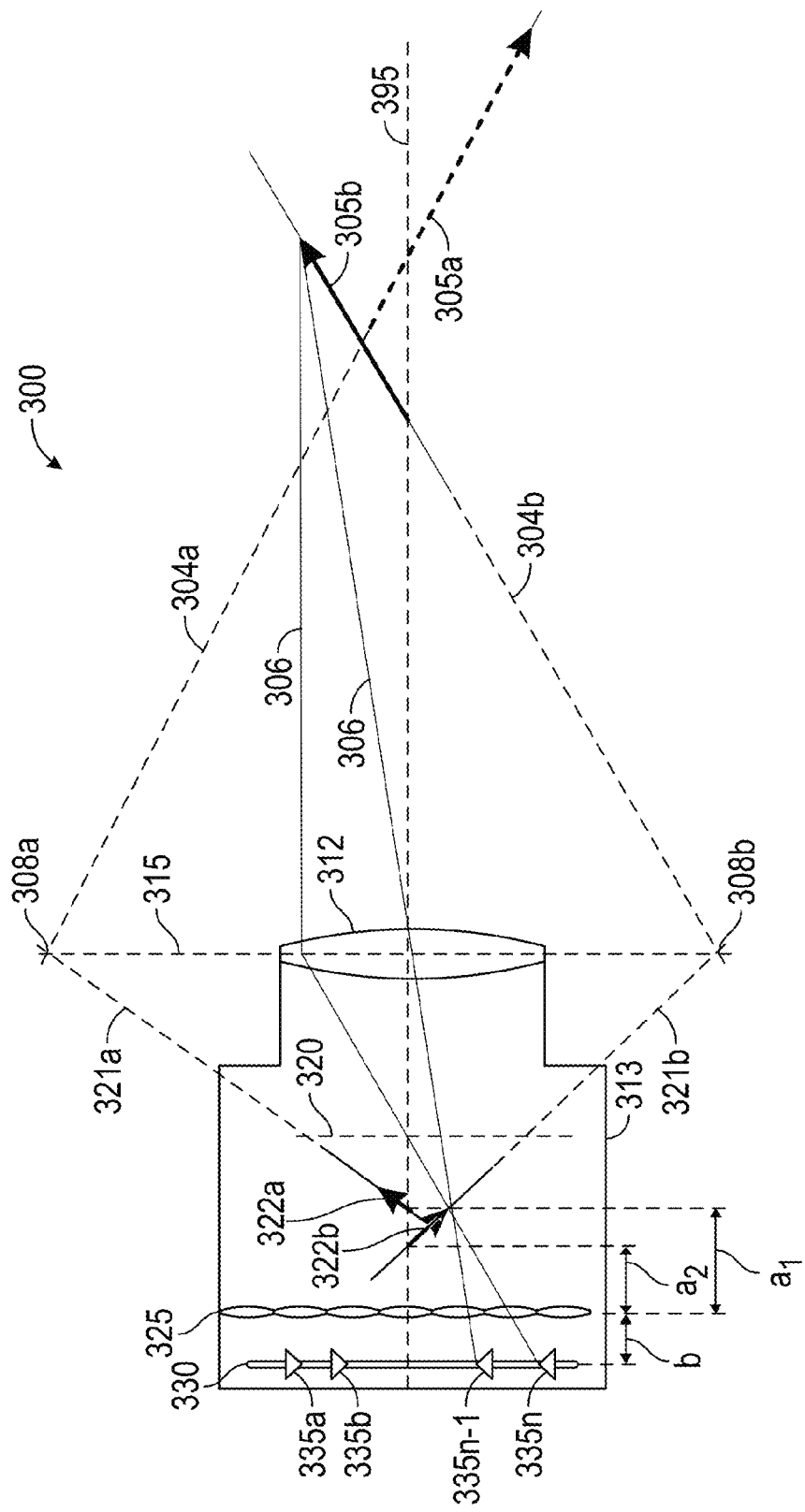
FIG. 3 is a schematic block diagram of an example of a plenoptic camera focusing an image on a tilted image plane in accordance with one embodiment.

FIG. 3 illustrates an example of a plenoptic camera 310 that is configured to utilize certain focusing methods, for example, in accordance with embodiments described herein. Plenoptic camera 310 may be similar to plenoptic camera 110 and configured to include Scheimpflug camera capabilities. For example, a plenoptic camera 310 may be capable of rendering an image of a target scene that is focused on one or more tilted object planes (e.g., tilted object planes 304a and 304b). For example, a plane of the target scene (for example, tilted object plane 304a) captured by the camera need not be parallel to the objective lens 312, thus the tilted image plane 321a need not be parallel to the objective lens 312 either. In some embodiments, a plenoptic camera 310 may facilitate the capturing of light-field data via microlens array 325, and an image 322a can be focused to any non-parallel image plane (e.g., tilted image plane 321a) after the micro images 335a and 335b and light-field data are captured by the photosensor 330. The distance between the microlens array 325 and the photosensor 330 is illustrated as distance b. Distance b may be adjusted, for example, in a substantially similar manner as described above with reference to the adjustment mechanism 160 of FIG. 1. In some embodiments, the depth of the image 322a may be adjusted after the image is captured as well.

FIG. 3 shows an exemplary plenoptic camera 310 utilizing optical elements that are substantially similar to those described in reference to FIGS. 1 and 2A-B to focus an image on a non-parallel image plane. As shown in FIG. 3, an image may be rendered by refocusing an image on a tilted image plane (e.g., tilted image planes 321a and 321b), however, the various physical components of the camera remain substantially parallel. As illustrated in FIG. 3, distance $a_1$ and $a_2$ define the distance from the microlens array 325 and the point at which the tilted image plane 321a and 321b intersect with the optical axis 395. FIG. 3 shows a single scene having two different object planes (e.g., tilted object plane 304a and tilted object plane 304b). However, it will be understood that a scene can include many different object planes, possibly an infinite number of object planes. Each object plane may represent a plane that the camera is attempting to focus upon. For example, target scene 305a is associated with tilted object plane 304a, while target scene 305b is associated with tilted object plane 304b. The plenoptic camera 310 of FIG. 3 may be substantially similar to the plenoptic camera 110 of FIG. 1, and includes the capability of focusing an image on any plane regardless of orientation with respect to the objective lens.

Referring to target scene 305a, FIG. 3 illustrates light rays 306 that represent two exemplary rays of light as the light rays 306 propagate through the plenoptic camera 310 originating from target scene 305a. Light rays 306 are focused at the tilted image plane 321a, tilted image plane 320a being non-parallel and tilted with respect to the optical components for plenoptic camera 310, to form image 322a. Distance b may be substantially equal to the focal length of one or more of the microlenses of microlens array 325. However, distance b need not be equal to the focal length of the microlenses, other arrangements are possible based on the sought after characteristics of the imaging device 300.

The non-parallel or tilted image plane 321a and objective lens plane 315 intersect at a single point, hereinafter referred to as the Scheimpflug intersection 308a. The tilted object plane 304a also intersects the objective lens plane 315 at the same intersection point. FIG. 3 also illustrates a Scheimpflug intersection 308b related to the target scene 305b through a similar relationship as described above with respect to target scene 305a.

Figure 4:
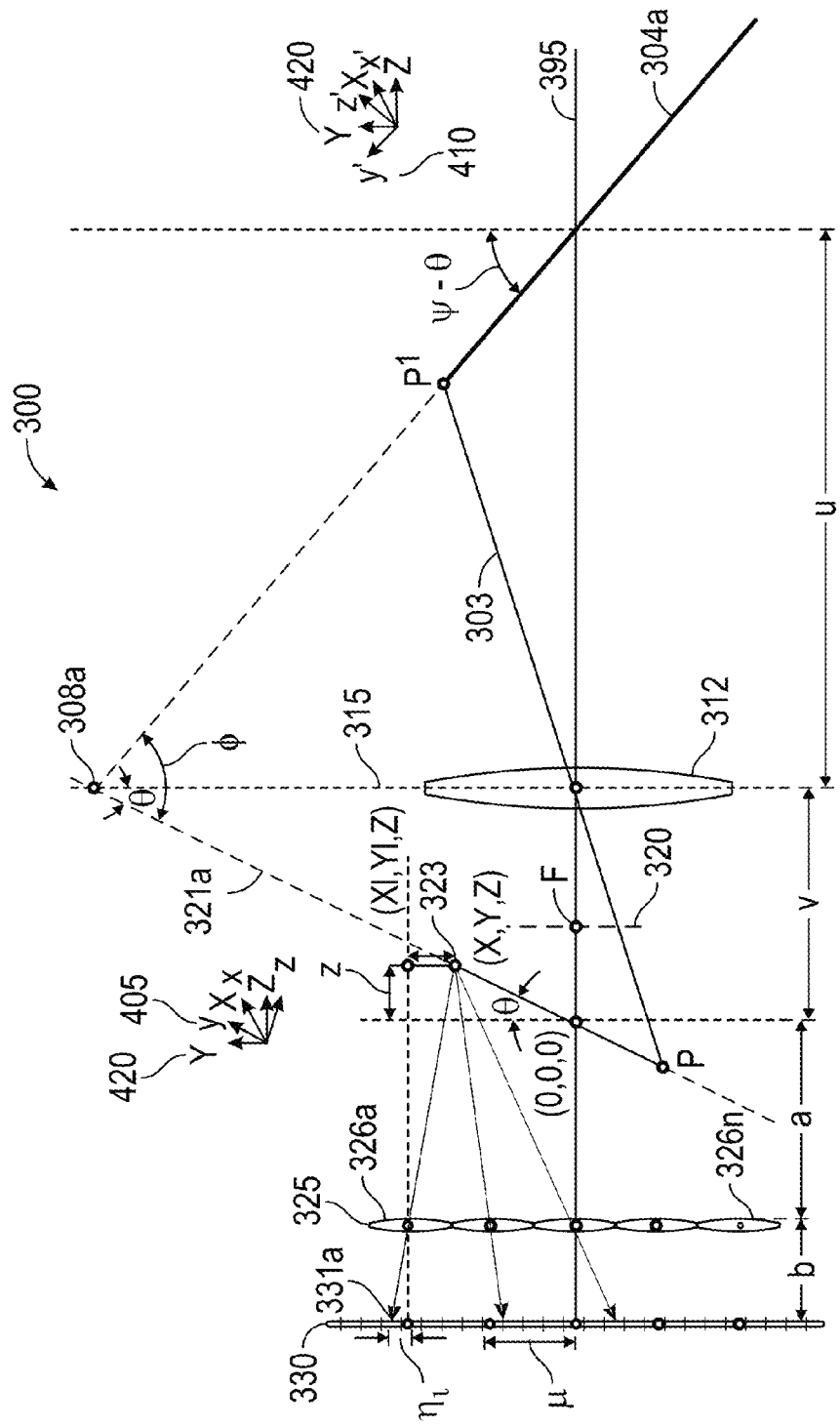
FIG. 4 is a schematic representation of determining offsets for points along a tilted image plane of FIG. 3.

FIG. 4 illustrates an optical image formation for a tilted object plane in a target scene. FIG. 4 depicts a schematic representation of the plenoptic camera 310 for illustrating the geometric relationship of the tilted image plane 321a and tilted object plane 304a to image plane 320 for us in the method of rendering a refocused image on a tilted image plane. In one embodiment, the tilted object plane 304a, objective lens plane 315, and tilted image plane 321a formed inside the plenoptic camera 310 intersect at a Scheimpflug intersection 308a, as described above with reference to FIG.

3. The Scheimpflug intersection 308*a* and the respective angles of the tilted object plane 304*a* and tilted image plane 321*a* relative to the image plane 320 define the bases used to determine a perspective or rotational transform. For example, the tilted image plane 321*a* may define an tilted image plane basis 405. The tilted object plane 304*a* may define an tilted object plane basis 410. The image plane 320 may define a fixed basis 420 from which the tilted image plane basis 405 and tilted object plane basis 410 are determined relatively against.

FIG. 4 is also a schematic representation of determining relative pixel locations of any selected point along the tilted image plane 321*a* in two-dimensional space. FIG. 4 may be a zoom-in schematic depiction of the microlens array 325 and photosensor 330 of FIG. 3. FIG. 4 depicts an image 322*a* having a tilted image plane 321*a*, the tilted image plane 321*a* being tilted with respect to photosensor 330. As illustrated in FIG. 4, an exemplary tilted image plane for refocusing on image upon may have a tilted image plane basis 405, wherein the tilted image plane basis is tilted relative to fixed basis 420 at that same angle as tilted image plane 321*a*. In one embodiment, an objective lens 312 may form a 2D image of a 2D target scene 305*a* using a microlens array 325. In other embodiments, described herein, the image may be a 3D image from a 3D target scene. The microlens array 325 may be substantially similar to microlens arrays 125 of FIG. 1.

The 2D image 322*a* may include multiple points that make up the image 322*a* along the tilted image plane 321*a*. The image may comprise an infinite number of points of focused light from the target scene. For any given point light-field data may be obtained by tracing light rays of the given point from the image plane through the various microlenses of the microlens array 325. Each point of the image 322*a* traced through the microlens array 325 creates a micro image corresponding to each microlens. For example, ray tracing light from point 323 through microlenses 326*a*, 326*b*, and 326*c* produces micro images (e.g., micro image 331*a*). In some embodiments, the number of micro images is the same as the number of microlenses, wherein each micro image corresponds or is associated with a particular microlens.

Once a micro image 331*s* is captured on the photosensor 330, the image processing system may be configured to determine, through computation, a relative pixel position of the micro image 331*a* on the photosensor 330. Light field data may comprise the determined relative pixel position and light intensity values captured by each pixel of the photosensor 330. In some embodiments, the relative pixel position includes spatial and angular data of each ray of light received by the photosensor generating the micro image.

In some embodiments, to focus an image on any image plane the data processing module 180 of FIG. 1 may be configured, with the memory 175 storing the light-field data and processor 170, to calculate offset values. In one implementation, to focus on a tiled image plane, the relative pixel positions are calculated by tracing a ray of light from each pixel on the tilted image plane to micro images and determining an offset value and pixel intensity is calculated from the radiance data captured by the photosensor. The relative pixel positions can be established from tracing a selected light ray through the plenoptic camera 310. For example, as shown in FIG. 4, offsets for any given point (e.g., point 323) of the tilted image plane 321*a* may be calculated based on the given pixels position relative to image plane 320. For example, for point 323 an offset value may be calculated based on the micro images generated by microlens array 325 and capture by photosensor 330. The offset values for point 323 can be combined with intensity values for the given point to generate light field data at the photosensor 330. The final image, being focused at the tilted image plane 321*a*, is then rendered by rendering module 190 of FIG. 1 using the light field data for all points along the tilted image plane 321*a* in accordance with the description above for FIG. 2.

The geometric arrangement for determining offsets is further illustrated in FIG. 4. FIG. 4 illustrates the photosensor 330 is a distance of b from the microlens array 325 and the tilted image plane 321*a* intersects the optical axis 395 at a distance a from the microlens array 325. The intersection point of the tilted image plane 321*a* and optical axis 395 is set as the origin of the geometry (e.g., a point of (0, 0, 0) on an X, Y, Z coordinate plane). The point 323 as coordinates of (x, y, z). As shown in FIG. 4, the microlenses of the microlens array have a size of $\mu$. In some embodiments, the size is a diameter of a microlens, where the microlenses are circular. It will be understood that other shapes are possible.

The geometry shown in FIG. 4 may be used by the data processing module 180 and/or processor 170 to determine offset values (e.g., the distance a point 323 is offset from the point on the image plane 320). For example, the micro image 331*a* is formed by tracing light rays from point 323 through microlens 326*a* and to photosensor 330. The offset of point 323 may be determined by using the principle of similar triangles:

$$\frac{\Delta \eta_i}{b} = \frac{Y_i - Y}{a + Z} \qquad \text{Eq. 1}$$

Where $\Delta \eta_i$ is the height of the micro image 331*a* as determined by the photosensor 330, b is the distance between the microlens 326*a* and photosensor 330, Yi is the distance from the center of the microlens 326*a* to the optical axis, Y is the Y coordinate value of the location of point 323, a is the distance as described above, and Z is the Z coordinate value of the location of point 323. From Eq. 1 the offset of the point 323 from the image plane 320 may be calculated in a 2D plane. While the preceding description was in reference to a single point, it will be understood that the same process may be performed for each point of image 322*a* along the tilted image plane 321*a*, of which there may be an infinite number of points. Once the offset values of each point are calculated, the offsets points may be entered as relative position data and combined with intensity data to provide light-field data to memory 175. From which, rendering module 190 may be configured to render an image along the tilted image plane 321*a*.

The same process may be performed for any tilted image plane. For example, for 3D relative offsets from the center of the microlenses can be established as using a similar approach. However, the equation application for determining 3D offsets is as follows:

$$\frac{(\xi_i, \eta_i)}{b} = \frac{(X_i, Y_i) - (X, Y)}{a + Z} \qquad \text{Eq. 2}$$

Where $\xi_i$, $\eta_i$ are offset value in the X and Y directions, respectively, from the center of the $i^{th}$ microlens using the $i^{th}$ micro image having coordinates $X_i$ and $Y_i$.

Figure 5:
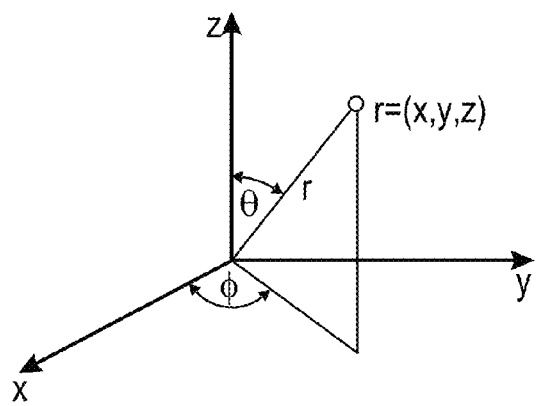
FIG. 5 illustrates an exemplary geometric parameterization of a non-parallel image plane.
Figure 6A:
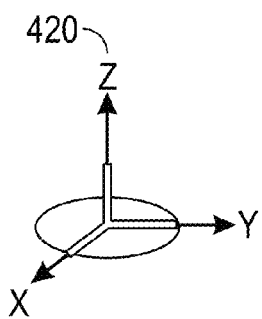
FIGS. 6A-D illustrates a rotation transformation using Euler angles.
Figure 6B:
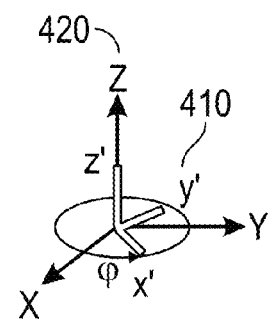
Figure 6C:
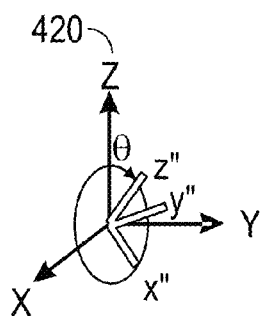
Figure 6D:
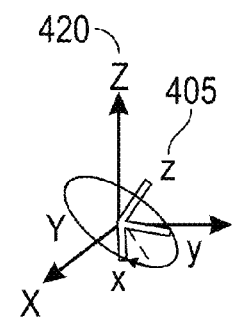

The tilted image plane that is in focus and is sought to be rendered, may be expressed by two parameters. These two parameters represent the normal vector to the planes in spherical coordinates. For example, as illustrated in FIG. 5, angle φ represents a direction in which the plane is tilted along a controlling axis of rotation (e.g., Z-axis in FIG. 5) and angle θ represents the amount of tilt for the chosen direction (e.g., the rotation of the plane from parallel to the Z-axis shown in FIG. 5).

The imaging device 100 of FIG. 1 may be configured to render pixels based on the tilted image plane, and coordinates of the points of an image are designated with respect to the tilted plane base. Accordingly, the captured radiance from the tilted image plane and the objective lens plane are in different bases, for example the base of the tilted image plane may be some angle relative to the base of the objective lens (e.g., the tilted image plane and sensor plane of FIG. 4). Therefore, the camera system can be configured to determine and establish a relationship between these two bases as a function of the relative angle between either base. For example, the x, y, and z plan of FIG. 6 represents the basis of the tilted image plane and the X, Y, and Z plane of FIG. 6 represents a the basis of the objective lens plane. The relation of X, Y, and Z to x, y, and z can be established using Euler angles with known amount of tilt.

FIG. 6 illustrates an exemplary arrangement using Euler angles with rotation angles (φ, θ, −φ), for the sequence of axis of rotations (z, y', z'') that corresponds to a tilt angle of the image plane representation mentioned.

From the Euler angles illustrated in FIG. 6, a corresponding rotation transformation matrix, represented by the numeral R, may be derived:

$$R = R_{Z''}(-\varphi) * R_{y'}(\theta) * R_{Z}(\varphi) \quad \text{Eq. 3}$$

This rotation transformation matrix can be evaluated as follows:

$$R = \begin{pmatrix} \cos\theta\cos^2\varphi + \sin^2\varphi & \cos\varphi\sin\varphi(\cos\theta - 1) & -\cos\varphi\sin\theta \\ \cos\varphi\sin\varphi(\cos\theta - 1) & \cos\theta\sin^2\varphi + \cos^2\varphi & -\sin\varphi\sin\theta \\ \sin\theta\cos\varphi & \sin\theta\sin\varphi & \cos\theta \end{pmatrix} \quad \text{Eq. 4}$$

The rotation transformation can be written as v=R*W, where:

$$v = (x,y,z)^T \text{ and } W = (X,Y,Z)^T \quad \text{Eq. 5}$$

Where T indicates transposing the functions v and W. For example, the rows are transposed to columns. And $$W = R^{-1} * v = (Rz''(-\varphi) * Ry'(\theta) * Rz(\varphi))^{-1} * v = (Rz''(-\varphi) * Ry'(-\theta) * Rz(\varphi)) * v \quad \text{Eq. 7}$$

In the embodiment described herein, the inverse matrix of Eq. 7 can be determined by substituting −θ in place of θ in Eq. 7. In some embodiments, this may be interpreted as a transformation to the original basis and can be obtained from tilted basis by tilting a negative angle with the same axis of tilt.

Using the above equations, the following values may be substituted. For a point on the image plane of z=0, Z in the original basis can be determined by:

$$Z = (x\sin(-\theta)\cos\varphi + y\sin(-\theta)\sin\varphi + 0*\cos\theta) \quad \text{Eq. 8}$$

Accordingly, Eq. 2 can be derived as follows:

$$\frac{(\xi_i, \eta_i)}{b} = \frac{b*(X_i, Y_i) - (X, Y)}{a - (x\sin\theta\cos\varphi + y\sin\theta\sin\varphi)} \quad \text{Eq. 9}$$

Numerator values can be substituted from Eq. 4, which results in:

$$\begin{pmatrix} X \\ Y \end{pmatrix} = \begin{pmatrix} \cos\theta\cos^2\varphi + \sin^2\varphi & \cos\varphi\sin\varphi(\cos\theta - 1) \\ \cos\varphi\sin\varphi(\cos\theta - 1) & \cos\theta\sin^2\varphi + \cos^2\varphi \end{pmatrix} * \begin{pmatrix} x \\ y \end{pmatrix} \quad \text{Eq. 10}$$

In some embodiments, the value of a, e.g., the distance from an un-tilted image plane to the microlens array, may be variable according to the adjustment mechanism 160 of FIG. 1 based on user interaction. Accordingly, for a setup with microlens having a size of μ, the disparity equation is:

$$\frac{b}{a} = \frac{\text{Pitch}}{\mu} \quad \text{Eq. 11}$$

where Pitch is the disparity of a point as seen from two adjacent microlenses.

Applying Eq. 11, the final positions of a point in micro images can be calculated as $$\xi_i = \frac{\text{Pitch} * \left(X_i - \begin{pmatrix}(\cos\theta\cos^2\varphi + \sin^2\varphi)*x + \\ (\cos\varphi\sin\varphi(\cos\theta - 1))*y\end{pmatrix}\right)}{\mu\left(1 - \frac{(x\sin\theta\cos\varphi + y\sin\theta\sin\varphi)\text{Pitch}}{\mu b}\right)} \quad \text{Eq. 12}$$

$$\eta_i = \frac{\text{Pitch} * \left(Y_i - \begin{pmatrix}(\cos\varphi\sin\varphi(\cos\theta - 1)*x) + \\ (\cos\theta\sin^2\varphi + \cos^2\varphi)*y)\end{pmatrix}\right)}{\mu\left(1 - \frac{(x\sin\theta\cos\varphi + y\sin\theta\sin\varphi)\text{Pitch}}{\mu b}\right)} \quad \text{Eq. 13}$$

Figure 7A:
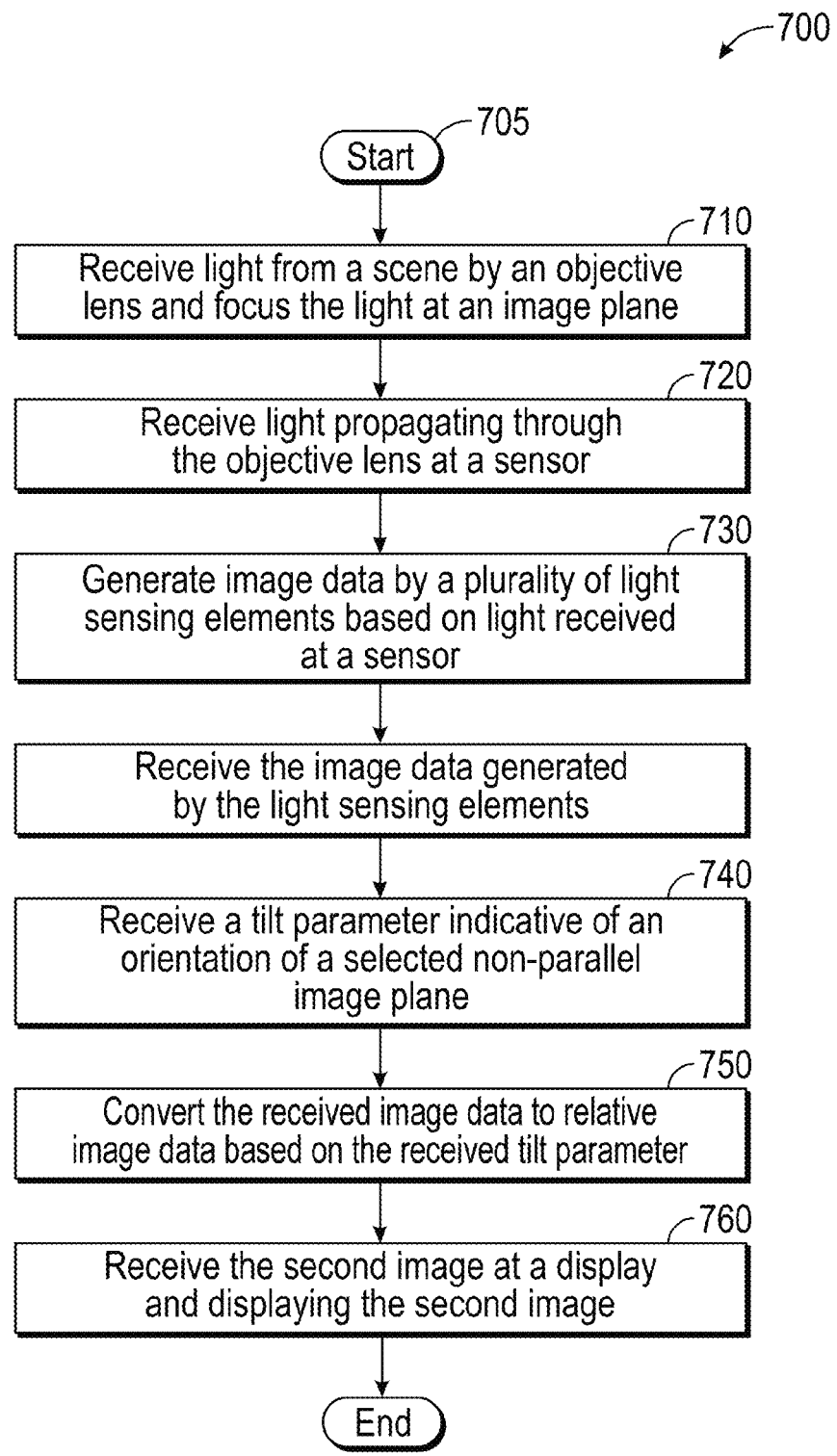
FIGS. 7A-C are flowcharts of an example of a method for displaying an image focused on a tilted image plane in accordance with some embodiments.
Figure 7B:
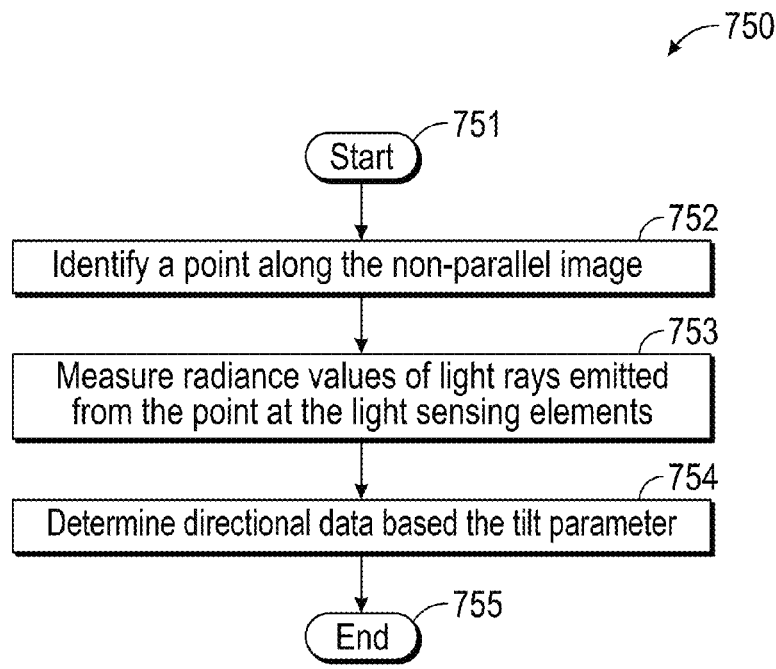
Figure 7C:
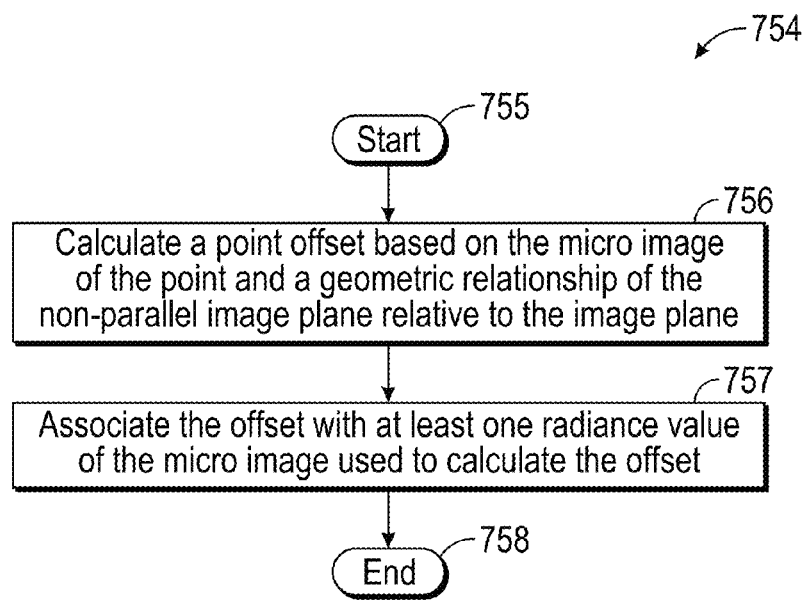

FIGS. 7A-C are flowcharts of a method 700 for displaying an image focused on a tilted image plane in accordance with one embodiment. Method 700 may be performed by imaging device 100 of FIG. 1 and/or imaging device 300 of FIGS. 3 and 4. In some embodiments, the method of displaying an image focused on a tilted image plane may be performed by the plenoptic camera 110 or 310 of FIGS. 1, 3, and 4 in communication with any one of the modules of image processing system 140. The method can be implemented as a software solution by the memory 175 or implemented elsewhere in the imaging device 100 or 300, for example one or more processors executed by a logic device in processor 170.

Method 700 begins at a start block 705 and then moves to block 710, where the imaging device receives light from a scene by an objective lens and focuses the light at an image plane. The objective lens may comprise one or more optical elements for focusing an image on the image plane, e.g., image plane 120 of FIG. 1 or image plane 320 of FIG. 3. In some embodiments, the objective lens has an objective lens plane and the scene may have an object plane that is tilted relative to the objective lens plane. In one embodiment, the light from the scene is received and focused when the user operates an input device to initiate the taking of a photograph or recording a scene. In one embodiment, the objective lens plane and the image plane are parallel.

After the imaging device receives the light from the scene, the method 700 moves to block 720, where the light that propagates through the objective lens is received at a sensor. In one embodiment, the sensor is located at a sensor plane, and includes a plurality of light sensing elements configured to measure and detect light incident thereon. In one embodiment, the sensor plane is parallel to the objective lens plane.

After the sensor receives the light through the objective lens, the method 700 moves to block 730, where the light sensing elements generate image data based on the received light at the sensor. In one embodiment, the image data is generated as a result of the light from the scene passing through the objective lens and through an optical element configured to produce light field data. For example, a microlens array 125 of FIG. 1 or microlens array of FIG. 3 may be disposed between the sensor and the objective lens to produce a plurality of micro images as described above. Each micro image may be received by the light sensing elements of the sensor, which may be configured to generate a radiance or amount of light for each micro image as well as spatial and angular data for each micro image based on the amount of light for each ray incident on the light sensing elements.

After the image data is generated, the method 700 moves to block 740 where a tilt parameter is received. The tilt parameter may be indicative of an orientation of a selected tilted or non-parallel image plane. The tilted image plane has an orientation relative to the objective lens plane such that an angle exists between the tilted image plane and the objective lens plane. As such the two planes are not parallel. In one embodiment, the user may operate controls 155 of FIG. 1 to manipulate the imaging system 100 to select a tilt parameter. The tilt parameter may be stored in the memory 175 and retrieved by processor 170. The tilt parameter may then be received by the data processing module 180 for use in method 700 as detailed herein and explained above with reference to FIGS. 3-6.

After the tilt parameter is received, the method 700 moves to sub-method block 750, where the image data is converted to relative image data based on the received tilt parameter. In some embodiments, the relative image data is indicative of a second image that is focused along the tilted image plane that is related to the tilt parameter. In some embodiments, the conversion of the image data into relative image data is performed in a manner substantially similar to that described above with reference to FIGS. 3-6. For example, the data processing module 180 may utilize image data, tilt parameters, and the geometrical relationship of the various planes to determine a relative position of a point of the second image. This process is carried out of each point that make up the image data to produce multiple points making up the second image data, from which the collection of points are able to produce a frame in a recording or a photograph. The sub-method of method block 750 will be explained further below with reference to FIGS. 7B and 7C.

After the image data is converted to second image data, the method 700 moves to block 760, where the second image is displayed. The second image is displayed based on the second image data, and is an image of the scene focused on the tilted image plane. The second image data may be converted by the data processing module 180, transmitted into memory 175, retrieved by rendering module 190 so that the image data may be organized and then provided to display 150. The display 150 may be configured to provide a visual image to the user of the scene as produced by the second image data.

FIG. 7B is a flowchart of sub-method 750 which is performed for multiple points the make up the image data, which starts at start block 751 then moves to block 752. At block 752 the imaging device identifies a point along the tilted image plane. For example, the data processing module 180 selects a point that is located on the selected tilted image plane.

After a given point is identified and selected, the sub-method 750 moves to block 753, where radiance values of the light rays emitted from the identified point are measured by the light sensing elements. For example, micro images may be produced on the light sensing elements from an optical element (e.g., a microlens array). The light sensing elements may be configured to measure the radiance value and store that value as part of the image data.

After the radiance value is measured, the sub-method 750 moves to method block 754, where directional data is determined for the identified point based on the title parameter. Sub-method 754 will be explained in further detail below with reference to FIG. 7C. In some embodiments, the directional data is determined as explained above with reference to FIGS. 3-6 using the perspective or rotational transforms to determine coordinates of the point on the various fixed and tilted image plane bases. After the directional data is determined the method 750 ends at end block 755. The sub-method 750 may return to method 700 and continue to block 760.

FIG. 7C is a flowchart of sub-method 754 for determining directional data based on the tilt parameter, which starts at start block 755. The sub-method 754 then moves to block 756, where an offset is determined for the identified point based on the tilt parameter. For example, the offset for the point may be determined based micro images of produced by an optical element (e.g., the microlens array 125 or 25 of FIGS. 1 and 3, respectively). In another embodiment, the offset may be geometrically derived based on the orientation of the tilted image plane relative to the image plane. The derivation of the offset may be substantially similar to the manner described above with reference to FIGS. 3-6.

After the offset of the point is determined, the sub-method 754 moves to block 757 where the offset is associated with the at least one radiance value of the point that the offset is determined for. The data processing module 180 and/or the rendering module 190 may be configured to associate the radiance value and offset data points to create the second image data. After the offset and radiance value are associated the sub-method 754 ends at end block 758. The sub-method 754 may return to method 700 and continue to block 760.

In one implementation of the imaging devices and methods disclosed herein, includes a user interface (UI), which can be incorporated in other applications related to 3D functionalities (for example video games, stereo, or microscopy). In one embodiment, the UI may be displayed on viewfinder/screen such as display 150 of FIG. 1, and the content displayed may be determined and rendered by the processor 170 and/or data processing module 180 of FIG. 1. For example, the data processing module 180 may be configured to determine relative pixel positions from light field data the display 150 may be configured to render the radiance values of each pixel at a relative pixel position so as to render the refocused image. In one embodiment, the UI may be configured to determine a rectangle to be rendered in the display and overlay the rectangle in the plane that is in focus in the scene. In this regard, after refocusing the captured image the rectangle may be positioned at some perspective relative to the sensor plane, thus it is displayed as a quadrilateral (after a perspective transform). In some embodiments, the rectangle is positioned according to the orientation of the image plane, for example the rectangle may be positioned based on the orientation of a tilted image plane relative to the objective lens. As such, the rectangle may be indicative of a current image plane that is in focus.

In one embodiment, the captured scene includes light field data as detailed above. The scene is brought into focus according to a given image plane, which may be in any orientation relative to the objective lens plane. The image plane might be parallel to the lens plane, tilted relative to the lens plane in accordance with the Scheimpflug principle, or focused at infinity (e.g., the far horizon would appear in focus).

As described above with reference to FIGS. 4-6, the perspective or rotation transform matrix (see Eq. 4) is calculated based on the geometric relationship of the objective lens and the image plane sought to be focused upon, thereby creating a light field inside the camera. When a real scene is captured as an image in the light field (e.g., at the image plane), the image is focused to an image plane and displayed by the camera. The image plane corresponding to the displayed image corresponds to a real plane in the captured scene. In some embodiments, for a visual appeal, the camera may be configured to show a virtual image plane that corresponds to the image plane in focus while the remainder of the captured image is out of focus. The virtual image plane may be represented as a rectangle having the perspective transform applied thereto, according, and the rectangle may be illustrated as a quadrilateral in 2D space.

With the above described Scheimpflug tilt controls, it may be difficult to visualize a tilted plane that is in focus in the displayed image. The tilted image plane may coincide with some real plane or a rectangular plane in the scene, the image plane may be hindered by some object in the scene, or there may be no object in plane being that is in focus.

In some embodiments, for visualization of image, the camera assumes a virtual fixed rectangle in the scene. The rectangular plane can be depicted on the image obtained and displayed by the camera using the rotation transformation (see Eq. 4). The rotation transform can be derived based on the tilt angle or geometric orientation of a given image plane relative to the objective lens plane, as detailed above with reference to FIGS. 4-6. This rectangle can also be overlaid on a focused image, where the plane of focus may be related to any orientation of image pane, with a certain level of transparency to permit uninhibited viewing of the captured scene while also viewing the overlaid rectangle. The size of the rectangle may be indicative of the depth of focus in the image. For example, a larger rectangle may indicate that the image plane in focus is closer to the imaging device. A smaller rectangle size may indicate the image plane in focus is farther from the imaging device. A rectangle size of zero may indicate the image plane in focus is at infinity. The camera may be able to adjust the overlaid rectangle to a distorted shape when image plane is tilted relative to lens plane (e.g., a quadrilateral representing the image plane, as shown below in FIGS. 8-11). If the image plane is tilted in either horizontally or vertically, one of parallelism is preserved in non-tilted direction and the rectangle forms image like trapezium.

Due to the optical element of the camera the rendered image plane can be mapped to different image planes positioned between the objective lens and the sensor having any orientation. These image planes and overlaid rectangle may be determined based on the Scheimpflug principle. For example, the angles between the image plane and objective lens can be estimated based on the Scheimpflug principle.

Referring to FIG. 4, a schematic view of plenoptic camera 310 is illustrated for an optical image formation of a tilted object plane 304a in a target scene. The tilted object plane 304a, objective lens plane 315, and tilted image plane 321a formed inside the plenoptic camera 310 intersect at a Scheimpflug intersection 308a. For example, a rectangle in the tilted object plane 304a can be represented with two parallel line pairs or four points. The points may have coordinates in the tilted object plane basis 410 (e.g., x'y'z' basis). As shown in FIG. 4, for a given point p' in the x'y'z' tilted object plane basis 410, the imaging device may be configured to determine a corresponding image formed by the objective lens 312 in the tilted image plane basis 405 (e.g., x, y, z basis) defining a point p. Note that the current image rendering happens in the x, y, z tilted image plane basis 405.

Figure 8:
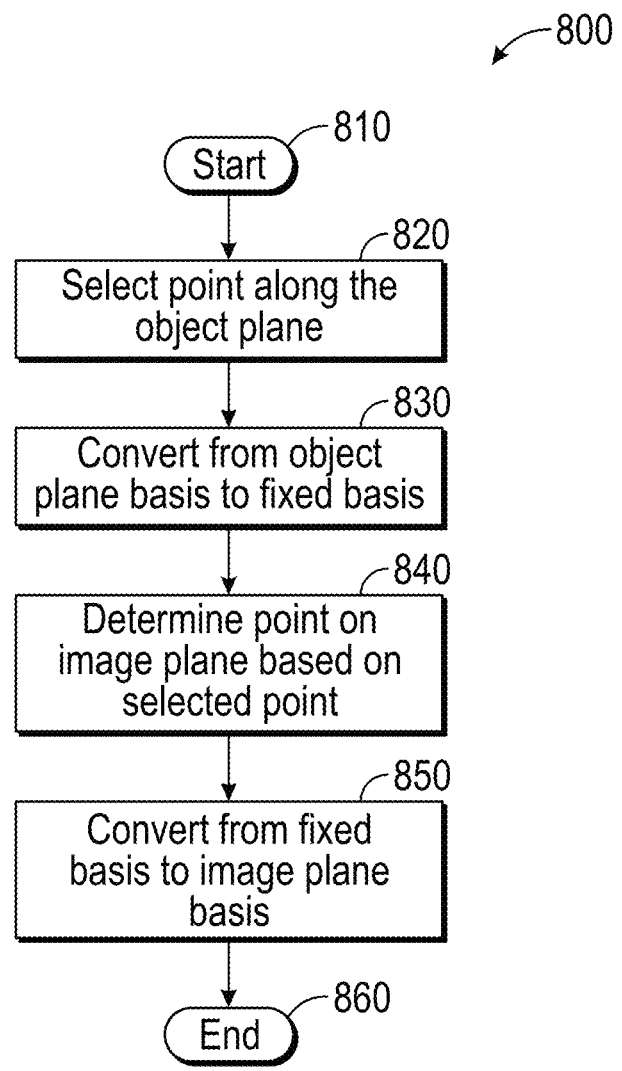
FIG. 8 is a flowchart of an example of a method for determining coordinates of a rectangular overlaid on an image indicative of a tilted image plane in accordance with some embodiments.

FIG. 8 is a flowchart of a method for determining coordinates of an image formed in the image plane basis by the objective lens of a target scene in the object plane basis. For example, a given point (e.g., p') on the tilted object plane 304a the main lens forms a corresponding point (e.g., p) on the titled image plane 321a. The method 800 is an exemplary method for determining coordinates of point p in the image plane based on known coordinates of point p' on the object plane. Method 800 may be performed by imaging device 100 of FIG. 1. In some embodiments, the method 800 may be performed by components of the optics 113 in communication with any one of the components of image processing system 140. The method can be implemented as a software solution by the memory 175 or implemented elsewhere by image processing system 140, for example one or more processors executed by a logic device in processor 170. In some embodiments, method 800 may be performed after a tilted image plane is determined and a refocused image is displayed on display 150.

The method beings at block 810 and proceeds to block 820. At block 820, the method 800 selects a point (e.g., point p') along the tilted object plane 304a. In some embodiments, the point may at least one point that makes up a rectangle to be overlaid on an image formed on the titled image plane 321a. After the point p' is selected, the process proceeds to block 820, where the angle of the object plane is determined. In one embodiment, the object plan may have a tilt angle of $\psi-\theta$, where given tilted image plane has a tilt angle $\theta$ as illustrate in FIG. 4.

After the angle of the object plane is determined, the method proceeds to block 830, where, the basis is converted for the selected point p', from the tilted object plane basis 410 to the fixed basis 420. This produces a point P' having coordinates defined in the fixed basis 420. After the point P' is determined in the fixed basis 420, the method 800 proceeds to block 840 where the imaging device determines point P. Point P, having coordinates in the fixed basis 420, is a point along the image plane corresponding to the point P' resulting from a ray trace from the target object through the objective lens 312 of FIG. 4, and onto the titled image plane 321a. In one embodiment, the point P' is determined through a lens transformation based on the physical characteristics of the objective lens 312.

After the coordinates of point P are determined in the fixed basis 840, the method 800 proceeds to block 850, where the coordinates of point P are converted from the fixed basis 420 to the tilted image plane basis 405. Converting between the fixed basis to the image plane basis determines a point p have a position in the tilted image plane basis 405 defined by coordinates in the tilted image plane basis 405. In some embodiments, the coordinates of point p define the location of the point p' in the image displayed in the display 150 of FIG. 1. In some embodiments, the method described in reference to FIG. 8 may be performed for any number of points in along the object plane and may be used to define any shape to be overlaid on the displayed image. Once the method 800 converts the coordinates of point P from the fixed basis to the image plane basis, the method 800 ends at block 860.

An exemplary description of the method 800 is described below with reference to FIG. 4. For example, where a tilted image plane 321a is tilted by an angle of φ, the corresponding tilted object plane 304a may be tilted in a geometrically related direction. The geometrical relationship is illustrated in FIG. 4 in the plane determined by φ. Using the Scheimpflug principle with the geometry in FIG. 4, the tangents of angles θ and (ψ−θ) are depicted to be in proportion to each other. For example, $$\frac{\tan(\theta)}{\tan(\psi - \theta)} = \frac{v}{u} \qquad \text{Eq. 14}$$

Where ψ−θ is the angle defined at Scheimpflug intersection 308a between the objective lens plane 315 and the tilted object plane 304a. The angle ψ is the angle between the tilted object plane 304a and the tilted image plane 321a, θ is the angle defined between the objective lens plane 315 and the tilted image plane 321a, v is the distance between the point at which the tilted image plane 321a intersects the optical axis 395 and the objective lens plane 315, and u is the distance between the intersection of the tilted image plane 321a and the optical axis 395 and the objective lens plane 315. Where the relation ψ−θ can be calculated for further use.

For conversion of coordinates between the different bases, the Euler angle approach, as detailed above with reference to FIGS. 5-7C, can be used and the formulae can be derived in a similar manner. Therefore, for a point p', the basis conversion from x'y'z' to XYZ, by a negative tilt angle of ψ−θ, with a tilt direction of φ, and a tilt with respect to point (0,0,(u+v)) as the origin is:

$$P'=((Rz''(-\varphi)*Ry'((\psi-\theta))*Rz(\varphi))*p')+(0,0,(u+v)) \qquad \text{Eq. 15}$$

From the previous discussion the tilted image plane 321a is formed as $(a,b,c)*(X, Y, Z)^T=0$ (e.g., plane normal is n=(a,b,c) where a=sin(−θ)cos φ, b=sin(−θ)sin φ, c=cos θ). Accordingly, the image point of P can be determined (e.g., block 840 of FIG. 8) by intersecting a ray 303 passing through the center of the objective lens 312 at (0,0, v) and point P' (e.g., the object plane point).

Next, the ray parametric equation can be written as:

$$(0,0,v)+s*((Rz''(-\varphi)*Ry'((\psi-\theta))*Rz(\varphi))*p')+(0,0,u) \qquad \text{Eq. 16}$$

And, by solving parametric equation at block 840 of FIG. 8, the coordinates of the intersection point P can be calculated to be:

$$X_i = \frac{x' * cv}{ax' + by' + cz'} \qquad \text{Eq. 17}$$

$$Y_i = \frac{y' * cv}{ax' + by' + cz'} \qquad \text{Eq. 18}$$

$$Z_i = v - \frac{z' * cv}{ax' + by' + cz'} \qquad \text{Eq. 19}$$

Since these equations are solved in (X, Y, Z) fixed basis 420, to find the corresponding pixel position on the display (e.g. display 150) of the rendered image, at block 850 the fixed basis 420 is converted to the tilted image plane basis 405. The tilted image plane basis 405 may be defined by a tilt of θ in direction of φ. The previous Euler relation established in Eq. 3 can be reused, which provides the following:

$$P=(R_{Z''}(-\varphi)*R_{y'}(\theta)*R_Z(\varphi))*P \qquad \text{Eq. 20}$$

Thus, using the method 800 as outlined above, by starting with a given point on a tilted object plane, a corresponding image can be determined and displayed on an image focused on a tilted image plane. In some embodiments, the four corners of a rectangle corresponding to the tilted image plane can be determined by applying the rotational transformation to the selected points along the tilted object plane to convert the points between tilted bases based on the geometric relationship as detailed herein.

In some embodiments, the value of the distance between the formed image and the optical element can be controlled by the pitch in the adjustment mechanism 160 of FIG. 1. Since the distance from the objective lens to the optical element is fixed for each setup and image capture (e.g., a distance D), the image distance formed by the objective lens can be determined by u+a=D. Proper calculations may be needed to be taken while calculating distances and millimeter to pixel conversions. For example, images may be in pixel units and distances may be in millimeter units, thus the raw image pixels can be in different units and proper care may be needed in converting between the different units.

FIGS. 9A-D illustrate the rectangular plane overlaid on a displayed scene. An embodiment is shown of an imaging device having a viewing window 900 displaying a target scene through captured images 905a (FIG. 9A), 905b (FIG. 9B), 905c (FIG. 9C), and 905d (FIG. 9D) each depicting the same scene focused at various tilted image planes. In one embodiment, the tilted image plane is represented by a transparent or partially transparent trapezium 930a-d. The trapezium represents the rectangular plane overlaid on the images 905a-d. The viewing window 900 may be on a display 150 or from a device such as imaging device 100 of FIG. 1, including a video camera, mobile phone, tablet, computer, etc.

Figure 9A:
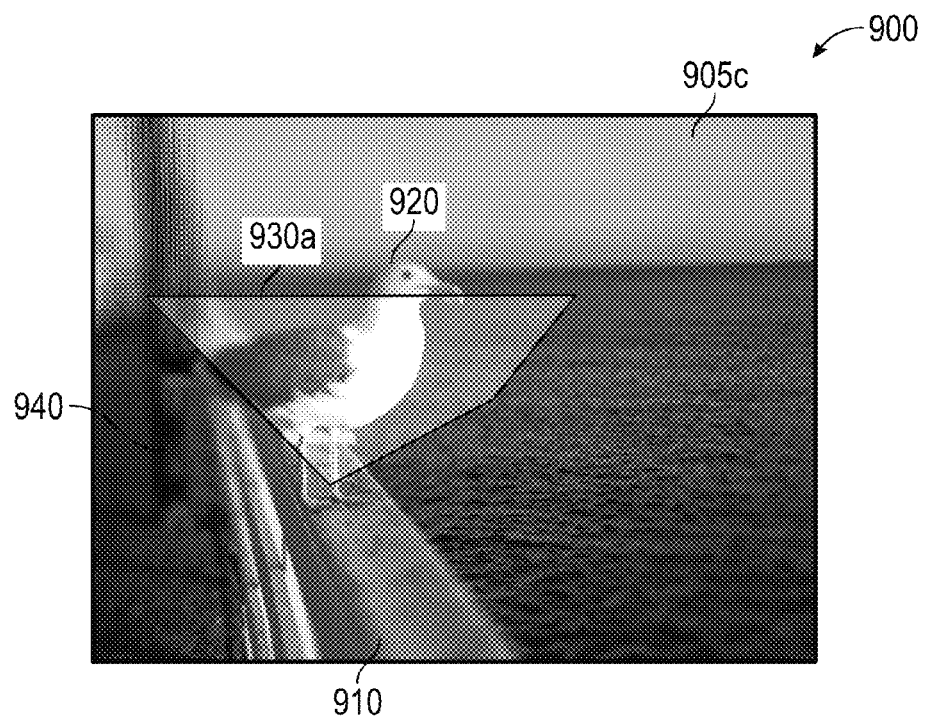
FIGS. 9A-9D illustrate a rectangular plane of focus overlaid on a displayed scene.
Figure 9B:
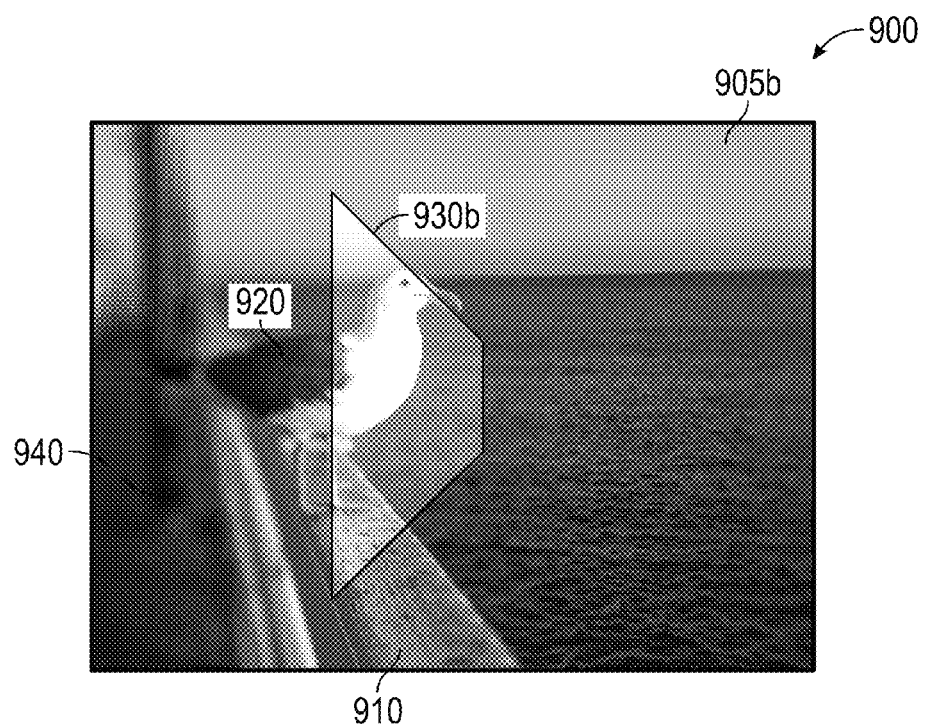
Figure 9C:
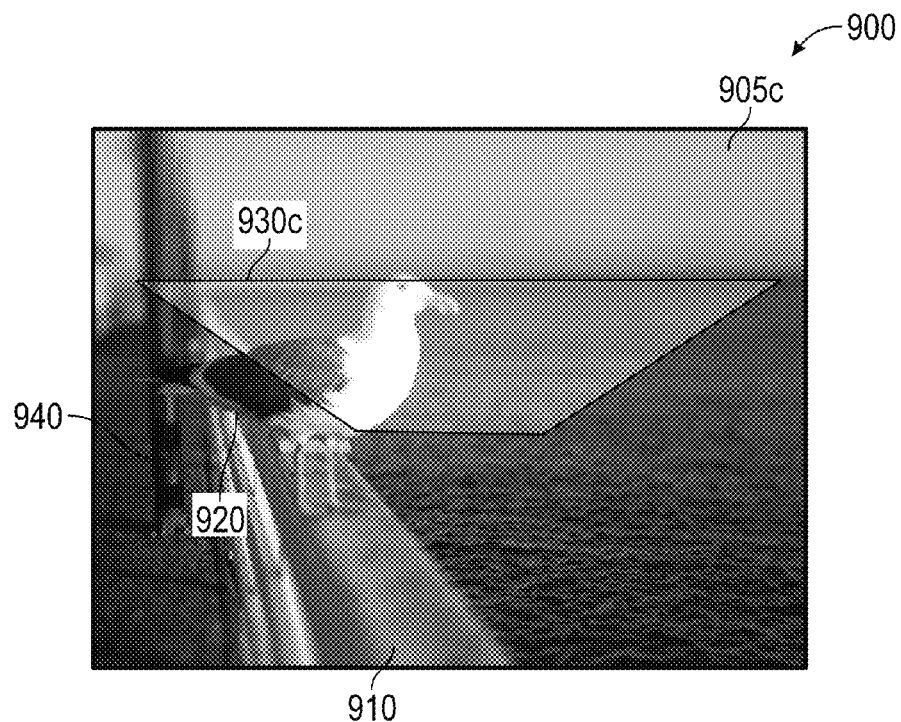
Figure 9D:
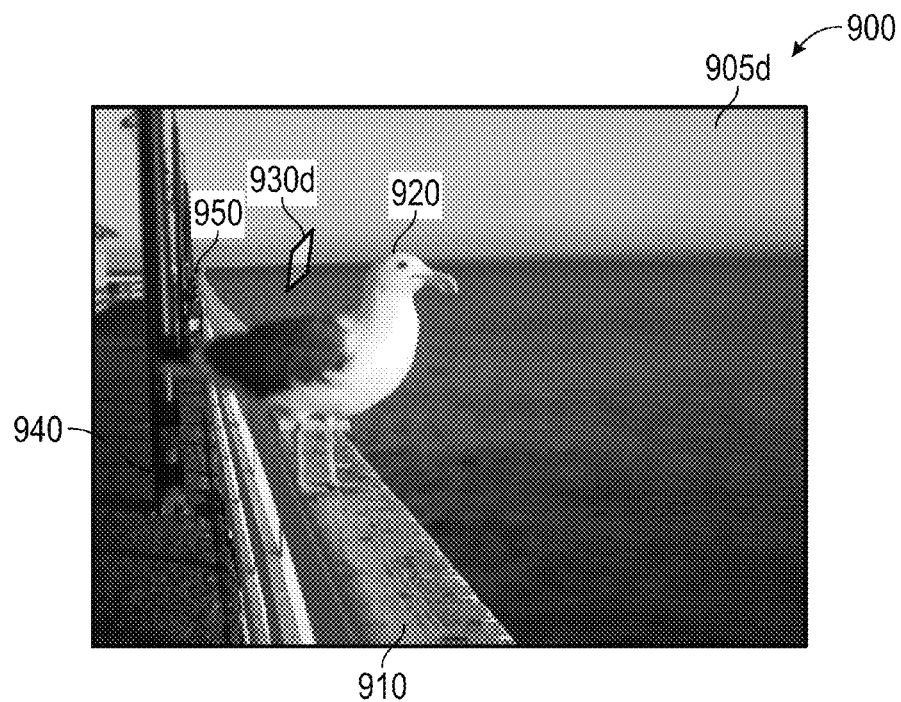

FIGS. 9A-9D illustrate a seagull 920 perched upon a railing 910 with a post 940 next to seagull 920. Also, included in each image, but only depicted in FIG. 9D a second seagull 950 is perched on railing 910 further away from the imaging device used to capture or record image 905. In some embodiments, viewing window 900 may show images captured or recorded by the imaging device, where the captured or recorded image is focused along an image plane represented by trapezium 930a-d. For example, FIG. 9A illustrates a captured or recorded image where the image is focused along on an image plane represented by trapezium 930a, such that the legs of seagull 920 and a slanted region of water are in focus. FIG. 9B illustrates a captured or recorded image where the image is focused along on an image plane represented by trapezium 930b, where the image plane is tilted only along the Y-axis of rotation. FIG. 9C illustrates a captured or recorded image where the image is focused along on an image plane represented by trapezium 930c, where the image plane is tilted only along the X-axis of rotation such that the tail of seagull 920 and bottom of post 940 are in focus. FIG. 9D illustrates a captured or recorded image where the image is focused along on an image plane represented by trapezium 930d, where the image plane effectively positioned at a distance from the imaging device (e.g., a small trapezium 930d) and tilted such that only the railing 910 is in focus along with permitting seagull 950 to be viewed at a far end of the wooden rail.

Implementations disclosed herein provide systems, methods and apparatus for actively and optimally aligning an optical system during assembly. One skilled in the art will recognize that these embodiments may be implemented in hardware, software, firmware, or any combination thereof.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the process discussed above. The device may also have data, a processor loading instructions and/or data from memory, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the objective function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An imaging apparatus comprising:
an objective lens positioned at an objective lens plane, the objective lens configured to focus light received from a scene at an image plane;
a sensor positioned to receive light propagating through the objective lens, the sensor having a plurality of light sensing elements disposed on a surface of the sensor in a sensor plane, the light sensing elements configured to generate image data based on the light received at the sensor, the sensor plane being parallel to the objective lens plane;
an optical element positioned to receive light propagating through the objective lens and disposed between the sensor and the objective lens, the optical element configured to produce micro images of the scene on the light sensing elements;
a processor operably coupled to the sensor;
a memory component, operably coupled to the processor, the processor and memory component collectively configured to:
receive the image data generated by the light sensing elements, the image data indicative of a first image focused at the image plane by the objective lens,
receive a user selected imaging plane comprising one or more tilt parameters indicative of an orientation of the user selected imaging plane tilted relative to the objective lens plane, wherein the user selected imaging plane is selectable independent of the scene, and
convert the received image data to relative image data indicative of a second image focused along a non-parallel image plane tilted relative to the image plane, the non-parallel image plane based on the received one or more tilt parameters and a geometric relationship between the image plane and the user selected imaging plane, wherein converting the received image data to relative image data comprises, for each point of a plurality of points along the non-parallel image plane, measuring radiance values at the light sensing elements of light rays emitted from the point, wherein the radiance values are representative of the micro images of the point at the light sensing elements, and
a display in data communication with the processor, the display configured to receive the second image from the processor and display the second image.

2. The imaging apparatus of claim 1, wherein the processor and memory component are further collectively configured to determine the angle between the non-parallel image plane and the image plane based on the tilt parameters.

3. The imaging apparatus of claim 1, wherein the image data is light field data of the scene.

4. The imaging apparatus of claim 1, wherein converting the received image data to relative image data comprises, for each point of a plurality of points along the non-parallel image plane
determining directional data based on the one or more tilt parameters.

5. The imaging apparatus of claim 4, wherein determining directional data comprises, for each micro image of the point:
calculating a point offset based on a geometry of the optical element and the tilt parameters; and
associating the offset with at least one radiance value of the micro image used to calculate the offset.

6. The imaging apparatus of claim 1, wherein the optical element comprises at least one of:
a microlens array comprising a plurality of microlenses, each microlens configured to produce a micro image of the scene; and
a plurality of cameras arranged in an array and configured to produce a plurality of micro images of the scene at the sensor.

7. The imaging apparatus of claim 1, wherein the processor and the memory component are further configured to determine a relative position of each micro image on the sensor, wherein the image data includes the relative position and radiance value captured at each light sensing element.

8. The imaging apparatus of claim 1, wherein the image plane is positioned at a focal point of the objective lens and is parallel to the objective lens plane.

9. The imaging apparatus of claim 1, wherein the image data comprises radiance data and spatial and angular data of the scene based on the light received by the light sensing elements.

10. The imaging apparatus of claim 1, wherein the user selected imaging plane and the objective lens plane intersect at an intersection line.

11. The imaging apparatus of claim 10, wherein the non-parallel image plane intersects the intersection line of the non-parallel image plane and the objective lens plane.

12. The imaging apparatus of claim 1, further comprising a plenoptic camera.

13. An imaging apparatus comprising:
an objective lens positioned at an objective lens plane, the objective lens configured to focus light received from a scene at an image plane;
a sensor positioned to receive light propagating through the objective lens, the sensor having a plurality of light sensing elements disposed on a surface of the sensor in a sensor plane, the light sensing elements configured to generate image data based on the light received at the sensor, the sensor plane being parallel to the objective lens plane;
an optical element positioned to receive light propagating through the objective lens and disposed between the sensor and the objective lens, the optical element configured to produce micro images of the scene on the light sensing elements;
a processor operably coupled to the sensor;
a memory component, operably coupled to the processor, the processor and memory component collectively configured to:
receive the image data generated by the light sensing elements, the image data indicative of a first image focused at the image plane by the objective lens,
calculate relative positions of the image data based on a ray trace of light from a point along the non-parallel image plane to the micro image captured by the optical element, the micro image representing a micro image of the point;
receive a user selected imaging plane comprising one or more tilt parameters indicative of an orientation of the user selected imaging plane tilted relative to the objective lens plane, wherein the user selected imaging plane is selectable independent of the scene, and
convert the received image data to relative image data indicative of a second image focused along a non-parallel image plane tilted relative to the image plane, the non-parallel image plane based on the received one or more tilt parameters and a geometric relationship between the image plane and the user selected imaging plane; and a display in data communication with the processor, the display configured to receive the second image from the processor and display the second image.

14. An imaging apparatus comprising:

an objective lens positioned at an objective lens plane, the objective lens configured to focus light received from a scene at an image plane;

a sensor positioned to receive light propagating through the objective lens, the sensor having a plurality of light sensing elements disposed on a surface of the sensor in a sensor plane, the light sensing elements configured to generate image data based on the light received at the sensor, the sensor plane being parallel to the objective lens plane;

a processor operably coupled to the sensor;

a memory component, operably coupled to the processor, the processor and memory component collectively configured to:

receive the image data generated by the light sensing elements, the image data indicative of a first image focused at the image plane by the objective lens, receive a user selected imaging plane comprising one or more tilt parameters indicative of an orientation of the user selected imaging plane tilted relative to the objective lens plane, wherein the user selected imaging plane is selectable independent of the scene, and convert the received image data to relative image data indicative of a second image focused along a non-parallel image plane tilted relative to the image plane, the non-parallel image plane based on the received one or more tilt parameters and a geometric relationship between the image plane and the user selected imaging plane, generate a quadrilateral overlay on the displayed second image indicative of the user selected imaging plane comprising the tilt parameters, wherein the quadrilateral overlay is based on a projective transform derived from the geometric relationship between the user selected imaging plane and the objective lens plane; and a display in data communication with the processor, the display configured to receive the second image from the processor and display the second image.

15. A method for displaying an image of a scene, the method comprising:

receiving light from a scene by an objective lens and focusing the light at an image plane, the objective lens having an objective lens plane;

receiving light propagating through the objective lens by an optical element disposed between a sensor and the objective lens, the sensor having a plurality of light sensing elements disposed on a sensor plane;

producing micro images of the scene on the light sensing elements by the optical element;

generating image data by the plurality of light sensing elements based on light received at the sensor, wherein the image data is light field data of scene;

receiving the image data generated by the light sensing elements, the image data indicative of a first image focused at the image plane by the objective lens, receiving a user selected imaging plane comprising one or more tilt parameters indicative of an orientation of the user selected imaging plane tilted relative to the objective lens plane, wherein the user selected imaging plane is selectable independent of the scene;

converting the received image data to relative image data indicative of a second image focused along a non-parallel image plane tilted relative to the image plane, the non-parallel image plane based on the received one or more tilt parameters and a geometric relationship between the image plane and the user selected imaging plane, wherein converting the received image data to relative image data further comprises measuring radiance values at the light sensing elements of light rays emitted from the point, wherein the radiance values are representative of the micro images of the point at the light sensing elements; and receiving the second image at a display and displaying the second image.

16. The method of claim 15, wherein the tilt parameters are based on the angle between the non-parallel image plan and the image plane.

17. The method of claim 15, wherein the image data is light field data of scene, and wherein converting the received image data to relative image data further comprises determining directional data based on the one or more tilt parameters.

18. The method of claim 17, wherein determining directional data comprises, for each micro image of the point:

calculating a point offset based on a geometry of the optical element and the tilt parameters; and associating the offset with at least one radiance value of the micro image used to calculate the offset.

19. The method of claim 15, wherein the optical element comprises at least one of:

a microlens array comprising a plurality of microlenses, each microlens configured to produce a micro image of the scene; and a plurality of cameras arranged in an array and configured to produce a plurality of micro images of the scene at the sensor.

20. The method of claim 15, wherein the image plane is positioned at a focal point of the objective lens and is parallel to an objective lens plane.

21. The method of claim 15, wherein the image data comprises radiance data and spatial and angular data of the scene based on the light received by the light sensing elements.

22. The method of claim 15, wherein the user selected imaging plane and the objective lens plane intersect at an intersection line.

23. The method of claim 15, further comprising determining a relative position of each micro image on the sensor; wherein the image data includes the relative position and radiance value captured at each light sensing element.

24. The method of claim 23, wherein relative positions of the image data are determined based on a ray trace of light from a point along the non-parallel image plane to the micro image captured by the optical element, the micro image representing a micro image of the point.

25. A method for displaying an image of a scene, the method comprising:

receiving light from a scene by an objective lens and focusing the light at an image plane, the objective lens having an objective lens plane;

receiving light propagating through the objective lens at a sensor, the sensor having a plurality of light sensing elements disposed on a sensor plane;

generating image data by the plurality of light sensing elements based on light received at the sensor;

receiving the image data generated by the light sensing elements, the image data indicative of a first image focused at the image plane by the objective lens, receiving a user selected imaging plane comprising one or more tilt parameters indicative of an orientation of the user selected imaging plane tilted relative to the objective lens plane, wherein the user selected imaging plane is selectable independent of the scene;

converting the received image data to relative image data indicative of a second image focused along a non-parallel image plane tilted relative to the image plane, the non-parallel image plane based on the received one or more tilt parameters and a geometric relationship between the image plane and the user selected imaging plane;

receiving the second image at a display and displaying the second image; and generating a quadrilateral overlay on the displayed second image indicative of the user selected imaging plane comprising the one or more tilt parameters, wherein the quadrilateral overlay is based on a projective transform of a distorted rectangle on the non-parallel image plane, wherein the projective transform is derived from the geometric relationship between the user selected imaging plane and the objective lens plane.

26. A non-transitory computer readable medium comprising instructions that when executed cause a processor to perform a method of displaying an image of a scene, the method comprising:

receiving image data of the scene generated by a plurality of light sensing elements, the image data indicative of a first image focused at an image plane by the objective lens, wherein, the plurality of light sensing elements are disposed on a sensor plane of a sensor and configured to receive light propagating through the objective lens, the objective lens having an objective lens plane, wherein the objective lens is configured to focus light of the scene at the image plane;

receiving a user selected imaging plane comprising one or more tilt parameters indicative of an orientation of the user selected imaging plane tilted relative to the objective lens plane, wherein the user selected imaging plane is selectable independent of the scene;

converting the received image data to relative image data indicative of a second image focused along a non-parallel image plane tilted relative to the image plane, the non-parallel image plane based on the received one or more tilt parameters and a geometric relationship between the image plane and the user selected imaging plane; and receiving the second image at a display and displaying the second image; and generating a quadrilateral overlay on the displayed second image indicative of the user selected imaging plane comprising the one or more tilt parameters, wherein the quadrilateral overlay is based on a projective transform of a distorted rectangle on the non-parallel image plane, wherein the projective transform is derived from the geometric relationship between the user selected imaging plane and the objective lens plane.

27. An imaging device comprising:

a means for receiving light from a scene having a first plane;

a means for focusing the light at an image plane;

a means for receiving light propagating through the first plane having a second plane parallel to the first plane, and generating image data based on light received at the second plane;

a means for receiving the generated image data, the image data is indicative of a first image focused at the image plane;

a means for receiving a user selected imaging plane comprising one or more tilt parameters indicative of an orientation of the user selected imaging plane tilted relative to the objective lens plane, wherein the user selected imaging plane is selectable independent of the scene;

a means for converting the received image data to relative image data indicative of a second image focused along a non-parallel image plane tilted relative to the image plane, the non-parallel image plane based on the received one or more tilt parameters and a geometric relationship between the image plane and the user selected imaging plane; and a means for receiving the second image at a display and displaying the second image; and means for generating a quadrilateral overlay on the displayed second image indicative of the user selected imaging plane comprising the one or more tilt parameters, wherein the quadrilateral overlay is based on a projective transform of a distorted rectangle on the non-parallel image plane, wherein the projective transform is derived from the geometric relationship between the user selected imaging plane and the objective lens plane.

* * * * *